US007209817B2

(12) United States Patent
Abdel-Malek et al.

(10) Patent No.: US 7,209,817 B2
(45) Date of Patent: *Apr. 24, 2007

(54) DIAGNOSIS AND REPAIR SYSTEM AND METHOD

(75) Inventors: Aiman Abdel-Malek, Erie, PA (US); Brian Scallan, Erie, PA (US); Jeanette M. Bruno, Saratoga Springs, NY (US); Bryan A. Mathewson, Erie, PA (US); James E. Schlabach, Erie, PA (US); Gregory J. Fera, Erie, PA (US); Ivan Gomez, Erie, PA (US)

(73) Assignee: General Electric Company, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/091,297

(22) Filed: Mar. 28, 2005

(65) Prior Publication Data

US 2005/0171661 A1 Aug. 4, 2005

Related U.S. Application Data

(63) Continuation of application No. 09/644,421, filed on Aug. 23, 2000.

(60) Provisional application No. 60/162,046, filed on Oct. 28, 1999, provisional application No. 60/225,231, filed on Aug. 14, 2000.

(51) Int. Cl.
*G06F 17/30* (2006.01)
*H04J 3/24* (2006.01)
(52) U.S. Cl. ............... 701/33; 701/35; 340/988
(58) Field of Classification Search ............... 701/2, 701/29, 35, 30, 33, 24, 34; 340/988, 825.69, 340/457.4
See application file for complete search history.

(56) References Cited

U.S. PATENT DOCUMENTS 3,944,986 A  3/1976  Staples
4,258,421 A  3/1981  Juhasz et al.

(Continued)

FOREIGN PATENT DOCUMENTS

EP  0 573 171 A2  12/1993

(Continued)

OTHER PUBLICATIONS

Johnson, Daniel; "Data-Tronic Gas Turbine Information and Control System"; 1981; Schenectady, New York, USA.

*Primary Examiner*—Dalena Tran
(74) *Attorney, Agent, or Firm*—John L. DeAngelis; Beusse Wolter Sanks Mora & Maire, P.A.; Carlos L. Hanze, Esquire

(57) ABSTRACT

A diagnosis and repair recommendation system for a railroad locomotive is disclosed. The system uses generalized repair recommendations and instantiates them to a specific repair process for a unique road number locomotive. In addition to repair steps to be executed by the technician, the method and system remotely provides supporting documentation specifically tailored for each step in the repair process. As the repair is being conducted, feedback information is entered by the technician. The repair recommendations and the supporting documents are available to the technician via a remote unit, thereby allowing the technician to access the repair steps and supporting documentation while the repair is in progress.

48 Claims, 18 Drawing Sheets

U.S. PATENT DOCUMENTS

| | | |
|---|---|---|
| 4,270,174 A | 5/1981 | Karlin et al. |
| 4,404,639 A * | 9/1983 | McGuire et al. ............... 701/35 |
| 4,463,418 A | 7/1984 | O'Quin, II et al. |
| 4,517,468 A | 5/1985 | Kemper et al. |
| 4,525,782 A | 6/1985 | Wohlfarth et al. |
| 4,695,946 A | 9/1987 | Andreasen et al. |
| 4,823,914 A | 4/1989 | McKinney et al. |
| 4,970,725 A | 11/1990 | McEnroe et al. |
| 4,977,390 A | 12/1990 | Saylor et al. |
| 5,113,489 A | 5/1992 | Cihiwsky et al. |
| 5,123,017 A | 6/1992 | Simpkins et al. |
| 5,274,572 A | 12/1993 | O'Neill et al. |
| 5,282,127 A | 1/1994 | Mii |
| 5,321,837 A | 6/1994 | Daniel et al. |
| 5,329,465 A | 7/1994 | Arcella et al. |
| 5,400,018 A | 3/1995 | Scholl et al. |
| 5,432,904 A | 7/1995 | Wong |
| 5,442,553 A | 8/1995 | Parrillo |
| 5,445,347 A | 8/1995 | Ng |
| 5,508,941 A | 4/1996 | Leplingard et al. |
| 5,528,499 A | 6/1996 | Hagenbuch |
| 5,528,516 A | 6/1996 | Yemini et al. |
| 5,594,663 A | 1/1997 | Messaros et al. |
| 5,631,832 A | 5/1997 | Hagenbuch |
| 5,633,628 A | 5/1997 | Denny et al. |
| 5,638,296 A | 6/1997 | Johnson et al. |
| 5,650,928 A | 7/1997 | Hagenbuch |
| 5,650,930 A | 7/1997 | Hagenbuch |
| 5,661,668 A | 8/1997 | Yemini et al. |
| 5,666,534 A | 9/1997 | Gilbert et al. |
| 5,678,002 A | 10/1997 | Fawcett et al. |
| 5,713,075 A | 1/1998 | Threadgill et al. |
| 5,732,074 A | 3/1998 | Spaur et al. |
| 5,737,215 A | 4/1998 | Schricker et al. |
| 5,742,915 A | 4/1998 | Stafford |
| 5,758,300 A | 5/1998 | Abe |
| 5,809,161 A | 9/1998 | Auty et al. |
| 5,842,125 A | 11/1998 | Modzelesky et al. |
| 5,845,272 A | 12/1998 | Morjaria et al. |
| 5,884,073 A | 3/1999 | Dent |
| 5,884,202 A | 3/1999 | Arjomand |
| 5,926,745 A | 7/1999 | Threadgill et al. |
| 5,931,878 A | 8/1999 | Chapin, Jr. |
| 5,949,345 A | 9/1999 | Beckert et al. |
| 5,950,147 A | 9/1999 | Sarangapani et al. |
| 5,978,717 A * | 11/1999 | Ebersohn et al. ............. 701/19 |
| 5,979,757 A | 11/1999 | Tracy et al. |
| 5,988,645 A | 11/1999 | Downing |
| 6,028,537 A | 2/2000 | Suman et al. |
| 6,058,307 A | 5/2000 | Garner |
| 6,070,155 A | 5/2000 | Cherrington et al. |
| 6,084,870 A | 7/2000 | Wooten et al. |
| 6,094,609 A | 7/2000 | Arjomand |
| 6,104,988 A | 8/2000 | Klarer |
| 6,112,085 A | 8/2000 | Garner et al. |
| 6,161,071 A | 12/2000 | Shuman et al. |
| 6,169,943 B1 | 1/2001 | Simon et al. |
| 6,181,994 B1 | 1/2001 | Colson et al. |
| 6,212,449 B1 | 4/2001 | Wellman et al. |
| 6,263,265 B1 | 7/2001 | Fera |
| 6,263,322 B1 | 7/2001 | Kirkevold et al. |
| 6,330,499 B1 | 12/2001 | Chou et al. |
| 6,434,455 B1 * | 8/2002 | Snow et al. ................... 701/33 |
| 6,857,013 B2 * | 2/2005 | Ramberg et al. ............. 709/223 |

FOREIGN PATENT DOCUMENTS

| | | |
|---|---|---|
| EP | 0 845 894 A2 | 6/1998 |
| GB | 2 321 889 A | 8/1998 |
| JP | 10108277 | 4/1998 |
| WO | WO 00/35732 A1 | 6/2000 |

* cited by examiner

DIAGNOSIS AND REPAIR SYSTEM AND METHOD

This application claims the benefit of U.S. Provisional Application 60/162,046 filed on Oct. 28, 1999, and U.S. Provisional Application 60/225,231 filed on Aug. 14, 2000. The present application is a continuing application claiming the benefit of the application filed on Aug. 23, 2000, and assigned application Ser. No. 09/644,421.

BACKGROUND OF THE INVENTION

This invention relates to a method and system for receiving repair recommendations and related information from a central diagnostic and repair service center at a remote location, for repairing, for instance, a railroad locomotive.

The diagnosis, maintenance, and repair of a complex vehicle, such as an off-road vehicle, ship, airplane or railroad locomotive involves extremely complex and time consuming processes. Efficient and cost-effective operation of a fleet of such vehicles necessitates a reduction in the number of vehicle road failures and minimization of vehicle downtime. This can be accomplished by predicting impending failures, by performing preventative maintenance, and by performing repairs quickly and accurately. For example, it will be appreciated that the ability to predict failures before they occur allows for performing condition-based maintenance. Such maintenance can be conveniently scheduled based on statistically and probabilistically meaningful vehicle status information, instead of performing the maintenance regardless of the actual condition of the subsystem, such as would be the case if the maintenance is routinely performed independent of whether the subsystem actually requires the maintenance.

The conventional diagnosis and repair process for most vehicles and machines is based on the experience of the service technician, using paper-based information describing the structure and operation of the machine, and performance records maintained in a log. Examining the log entries, experienced service technicians can use their accumulated experience and training in mapping incidents occurring in locomotive subsystems to problems that may be causing these incidents. For simple problems, this process works well. However, if the problem is complex and the root cause difficult to discern, the experienced technician may be unable to identify the problem and certainly much less likely to prognosticate problems before they occur.

A machine, such as a locomotive or other mobile asset used in industrial processes, telecommunications, aerospace applications, power generation, etc. often incorporates diagnostic controls and sensors that report faults when anomalous operating conditions of the machine arise. Typically, to diagnose the problem, a technician will study the fault log to identify the nature of the problem and determine whether a repair is necessary. While the fault log can provide some diagnosis and repair information, the technician also relies substantially on his prior experiences with the machine, or others like it, to make a full diagnosis.

To conduct the repair, the technician uses block diagrams, exploded diagrams, parts lists, assembly drawings, schematics, etc. The repair information may be applicable only to a specific machine by model number; the repair information will generally not be unique to the specific machine undergoing repair. It is obvious that as the complexity of the machine increases, the amount of paper needed to describe the machine to assist with the repair process likewise increases. Again, the technician will rely on his experiences with the machine, and others like it, to perform the repair.

Yet another problem with a paper-based system is the variety of fielded configurations, each having its own unique technical support documentation. Even for a specific model (identified by a model number), there may be several locomotive configurations as locomotive subsystems were redesigned or changed during the model production run. Thus, in a sense, no two locomotives are the same. Adding this configuration complexity to a paper-based system presents an inordinately complex and unmanageable problem of locating the correct technical repair documentation for a specific locomotive.

Another repair issue involving complex machines, such as railroad locomotives or other mobile assets, is the unavailability of a repair history from which one could predict component failures and undertake preventative maintenance beforehand. Technicians with wide ranging and lengthy experiences may be able to predict a component failure and repair it to avoid a breakdown during operation, in some limited situations.

One tool available for locomotive repair manually downloads fault logs from a locomotive while it is parked at a maintenance facility. These fault logs are then uploaded to the railroad maintenance service center. The tool also includes standardized helpful hints for repair tasks and fault analysis descriptors based on single failure faults. Although such a device represents an improvement over a paper-based system, it falls short of the informational needs for a complex machine, such as a locomotive, and fails to advantageously utilize the various technologies available for more efficiently predicting and performing the repair.

BRIEF SUMMARY OF THE INVENTION

The system and method of the present invention overcomes the limitations and disadvantages of the maintenance processes and tools described above by providing maintenance and repair information to the technician in real time at the site where the mobile asset is located. The present invention provides a communications link between the remote site, where the locomotive is parked, and a centrally-located monitoring and diagnostic service center (MDSC) where a plethora of information is stored and readily accessible by the technician at the remote site. In addition, the present invention provides a mechanism for capturing a detailed record of the repair event for subsequent validation of the repair's efficacy and for maintenance of a complete locomotive repair history. The remotely-based system of the present invention provides direct access to diagnosis and repair recommendations and documentation for a specific locomotive road number, thus overcoming the prior art problems associated with multiple locomotive configurations for a single model. These repair recommendations are generated at the monitoring and diagnostic service center by experts in locomotive trouble shooting and repair and are delivered to a portable unit at the remote site. The portable unit displays information related to execution of the repair, including individual repair steps and diagnostic tasks that may be necessary to isolate certain locomotive subsystems, to either eliminate or confirm a suggested repair methodology. The expert recommendations are supplemented by repair information, such as schematics, maintenance manuals, and other technical documentation stored at the MDSC and made available at the portable unit.

Further, when the technician enters the unique locomotive road number into the remote unit, he can retrieve the repair history for the locomotive and download any scheduled inspection procedures. Use of the locomotive road number (or another unique identification number) allows quick and accurate access to the applicable hardware and software configurations for that particular locomotive. Repair parts can also be ordered and tracked through the system of the present invention. Warranty information can be accessed and warranty claims submitted through the portable unit of the present invention. The portable unit incorporates graphical user interfaces for ease of use and comprehension. With the availability of all this information at track side, the repair process can sometimes be moved from the repair shop to run-through or service track sites, thus providing significant productivity gains and cost savings to the railroad. The portable unit can also interface with and communicate with the locomotive on-board monitoring systems for downloading or uploading fault and parametric operational data collected during operation.

Another advantage offered by the present invention is the reduction in locomotive failures while the locomotive is in service. By monitoring the locomotive operational parameters on a continuous basis, experts at the monitoring and diagnostic service center can conduct predictive analyses to identify components that are likely to fail in the near term. The predictive analysis process can use repair records from similar locomotives to identify potential failures. As a result of the predictive analysis, the monitoring and diagnostic service center can issue a repair recommendation for implementation by a technician, as discussed further herein below. Finally, in the event a failure occurs, the monitoring and diagnostic service center issues repair recommendations to correct the problem and provide a return to service in the near-term.

BRIEF DESCRIPTION OF THE DRAWINGS

The present invention can be more easily understood and the further advantages and uses thereof more readily apparent, when considered in view of the description of the preferred embodiments and the following figures in which.

DETAILED DESCRIPTION OF THE PREFERRED EMBODIMENTS

Figure 1:
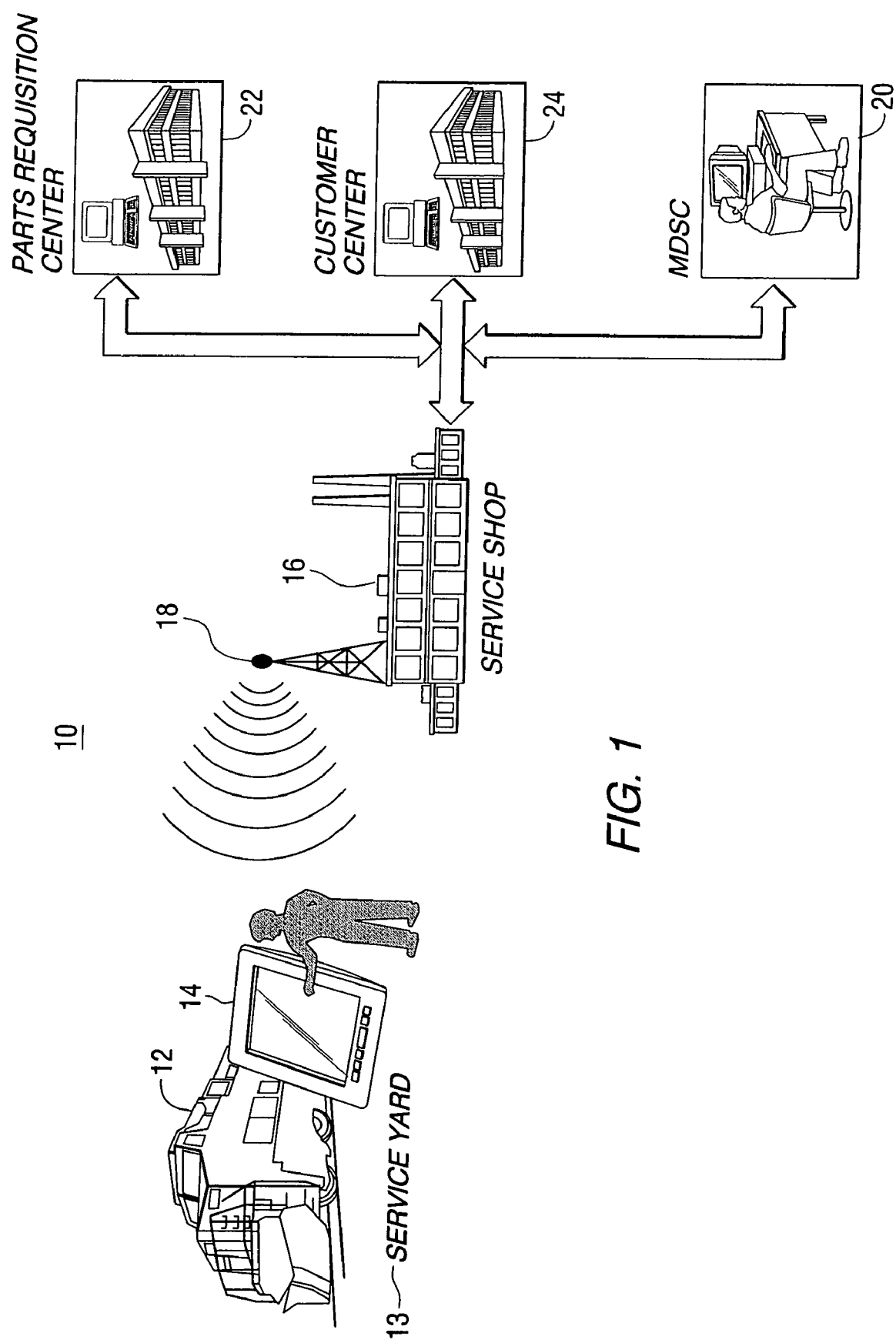
FIG. 1 is a pictorial rendering of a system incorporating the recommendation authoring and repair execution features of the present invention.

Before describing in detail the particular diagnosis and repair system and method in accordance with the present invention, it should be observed that the present invention resides primarily in a novel combination of processing steps and hardware related to the diagnosis and repair process for a locomotive. Accordingly, these processing steps and hardware components have been represented by conventional processes and elements in the drawings, showing only those specific details that are pertinent to the present invention, so as not to obscure the disclosure with structural details that will be readily apparent to those skilled in the art having the benefit of the description herein.

FIG. 1 is a pictorial rendering of a diagnosis and repair system embodying the inventive aspects of the present invention. Although illustrated and described with respect to a railroad locomotive 12, the teachings of the present invention may be applied to other types of mobile assets especially as part of a large fleet such as trucks, ships, off-road vehicles, airplanes, etc. The locomotive 12, preferably parked at a railroad service yard 13, is approached by a technician holding a portable unit 14. In one embodiment, the portable unit 14 (including an antenna 18) communicates with a railroad service shop 16 via any of the well-known wireless or wired communication systems and protocols, including an Internet connection using the TCP/IP protocols, tone modems, ISDN or XDSL protocols over the public switched telephone network or a cable modem. Access via the Internet to information at the MDSC 20 may be password protected, in one embodiment. As a further embodiment, an intranet including the portable unit 14, the service shop 16 and the MDSC 20 can be used to provide communications between these devices.

Repair, maintenance, and diagnostic information is exchanged between the portable unit 14 and a monitoring and diagnostic service center 20 (MDSC) via the railroad service shop 16. Parts information is exchanged between the portable unit 14 and a parts requisition center 22. Finally, contractual information, such as warranty information, is exchanged with a customer center 24. Generally, the parts requisition center 22, the customer center 24, and the MDSC 20 are located remote from the service shop 16 and the service yard 13. The requisition center 22, the customer center 24, the MDSC 20, and the service shop 16 may be linked via a global information network, such as the Internet and the World Wide Web, via an intranet or by point-to-point communications system, examples of which are discussed above. Because the Internet provides the ability to communicate data and information in a multimedia format, it is especially useful for communicating and displaying the large amount of data associated with the repair, maintenance and diagnosis of the locomotive 12.

Note that in another embodiment, the portable unit 14 can communicate directly (via a wired or wireless system using any of the communications techniques discussed above) with the parts requisition center 22, the customer center 24 and the MDSC 20, rather than communicating through the service shop 16. The portable unit 14 can also interrogate an on-board monitoring and diagnostic system (not specifically shown in FIG. 1) of the locomotive 12. The on-board monitoring and diagnostic system is described in detail in the patent application entitled "On-Board Monitor for a Railroad Locomotive", application Ser. No. 09/696,368, filed on Oct. 25, 2000, which is assigned to the owner of the present invention. The disclosure of this patent application is hereby incorporated by reference herein. The on-board monitor monitors certain operational parameters on the locomotive 12 and reports faults and anomalous conditions directly to the MDSC 20 via an independent communications system, as described in the aforementioned patent application.

While at the locomotive, the technician, using his portable unit 14, has access to a plethora of repair, diagnostic, and operational information needed to efficiently and accurately trouble shoot locomotive problems and undertake the necessary repairs. The portable unit 14 downloads repair recommendations generated by analysis software and/or locomotive repair experts at the MDSC 20. From the portable unit 14, the technician also has access to repair resources, such as repair manuals, field modification instructions, schematics, block diagrams, etc. Special software tools related to the repair task are also available at the portable unit 14, as transmitted from the diagnostic service center 20. The portable unit 14 allows easy and seamless integration of the repair recommendation with the railroad's work order system as managed and controlled at the service shop 16. The system provides parts ordering and parts tracking via communications with the parts requisition center 22. Repair experts at the monitoring and diagnostic service center 20 can also provide individualized assistance to the technician via the portable unit 14, using an instant messaging feature incorporated therein. Problem resolution suggestions and repair actions can be created prior to access by the repair technician or they can be authored in real time by experts at the monitoring and diagnostic service center 20 and immediately transmitted to the portable unit 14. The repair technician can also provide visual information back to the monitoring and diagnostic center 20 (over an Internet connection, for example) using a camera attached to the portable unit 14. Still or video images can be provided by such a camera. The video information may also be accompanied by live audio information (as spoken by the technician), thereby allowing the technician to communicate with personnel at the monitoring and diagnostic service center 20 to confer about a particular problem or repair action. In those cases where the locomotive components include a bar code for encoding certain features or characteristics of the component, a bar code reader attached to the portable unit 14 can be used to decode the bar code information and transmit the decoded information (or the bar code itself) to the monitoring and diagnostic service center 20 over the communication links previously described. The portable unit 14 and its visual interface replace the prior art paper-based information, thereby simplifying and expediting the repair process. Upon completion of the repair, the portable unit 14 generates a feedback report describing the nature of the problem and the repair actions taken. This report is sent to the monitoring and diagnostic service center 20, where it will be included with the repair history for that locomotive.

In essence, the present invention provides the technician with all the information he needs to effectively conduct the diagnosis and repair procedures, relying on information that is transmitted from sources distant from the repair site. Having all this information available, including help from repair experts, avoids the use of paper copies, and ensures a quick and accurate diagnosis and repair of the locomotive 12. Further, via the portable unit 14, the technician can request individualized expert assistance from the diagnostic service center 20 when problems or issues arise that he is incapable of handling.

The monitoring and diagnostic service center 20 is operated by personnel who are experts in trouble shooting railroad locomotives. Information received about the locomotive 12 from the portable unit 14 can be electronically processed and then visually displayed to these repair experts. The repair expert analyzes the information and produces a recommendation identifying the potential root cause or root causes of the problem. The repair information is then delivered to the portable unit 14 for execution of the recommended actions in a timely fashion, providing an enhanced degree of accuracy in carrying out the repair procedure.

There are at least three different classes of maintenance procedures to be performed on the locomotive 12. The first are predictive in nature. That is, based on information downloaded from the locomotive 12, experts at the monitoring and diagnostic service center 20 determine that a given component of the locomotive may be on a path toward eventual failure. It is important for the technician to replace this component to avoid a locomotive failure while it is in operation. The second class of maintenance procedures are those that are planned in advance to occur on a predetermined schedule. These are otherwise known as planned maintenance. Planned maintenance can be based on, for example, the number of locomotive service hours or the number of miles it has traveled since the last maintenance action. Again, the objective is to avoid failure during locomotive operation. In-service failures are especially costly and inefficient for railroad operations, because the locomotive and the train consist may nave to be moved back to a service facility to undertake the required repairs. Clearly, this is an expensive and disruptive effort for railroad operations. Finally, the last repair class is those maintenance problems requiring immediate attention due to a component failure that disables or causes derating of the locomotive. With regular and timely predictive and preventive maintenance, the number of maintenance actions in the third category can be minimized.

Although not illustrated in FIG. 1, it is well known in the art that the locomotive 12 may have an on-board monitoring system for monitoring and recording data related to various operational aspects. The on-board monitoring system identifies faulty components and provides fault codes for use by the repair technician in diagnosing the problem. Also, the on-board monitoring system records the number of miles traveled, the amount of fuel consumed, the number of service hours, etc. In some locomotives, there may be more than one on-board monitoring system, each associated with different locomotive subsystems. In any case, the technician, using his portable unit 14, can access data stored in the on-board monitoring system and transmit it to any of the recipient sites shown in FIG. 1. This operational information is extremely important in the diagnostic and repair process. In some cases, depending upon the nature of the fault or anomalous condition, the on-board monitor automatically transmits this information back to the MDSC 20, where a repair recommendation is formulated and then made available to the portable unit 14, in a manner to be discussed further below. For those locomotives that do not have an on-board monitor the technician must directly extract information from the locomotive 12 and forward this to the MDSC 20. To extract this information and provide it to the MDSC 20, the technician may use the video camera or bar code reader in conjunction with the portable unit 14, as discussed above.

Figure 2:
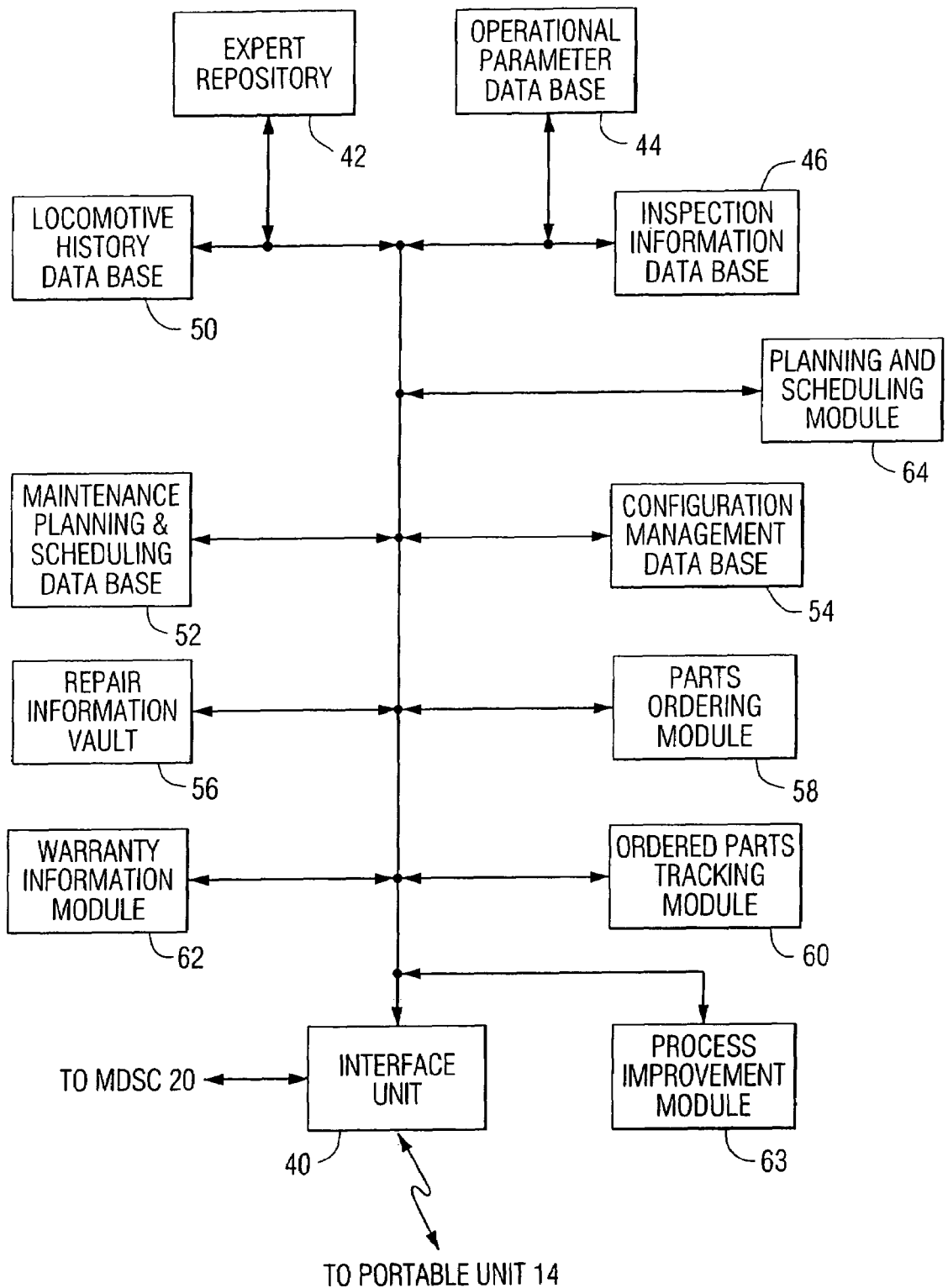
FIG. 2 is a block diagram showing subsystems of the present invention.

FIG. 2 is a block diagram illustrating the various databases and modules to which the technician has access (directly or indirectly) through the portable unit 14. The specific means by which the information shown in FIG. 2 is uploaded and downloaded to and from the portable unit 14 will be discussed in conjunction with the flowcharts of FIGS. 7 through 15. The databases and modules are also linked bi-directionally so that the technician can move seamlessly from one to the other either manually or automatically through a hyperlink process whenever the required information is stored in more than one location.

The present invention contemplates an electronic service delivery system (that is, E-izing) that allows many software applications and databases such as those illustrated in FIG. 2, to be available and utilized at the site where a technician is to perform diagnosis, maintenance, or repair services on any mobile asset, such as the locomotive 12. The present invention provides streamlining and standardizing of service information and multiple processes as well as providing the technician with all the required information needed to repair the locomotive 12 on location.

An interface unit 40 is shown generally for conditioning data transferred between the various information sources of FIG. 2 and the portable unit 14. The interface unit 40 provides data conditioning, modulation or demodulation of a carrier signal to transmit or recover an information signal and signal conditioning for baseband transmission, as dependent on the nature of the communications channel. The interface unit 40 supports both wired and wireless transmissions and their related protocols. Both the portable unit 14 and the MDSC 20 communicate bi-directionally with the various databases and modules of FIG. 2 for the purpose of entering data into or extracting data from the databases and modules.

An expert repository 42 stores the repair recommendations authored at the MDSC 20. These recommendations include: suggested repairs based on operational and/or failure information extracted from the on-board monitoring system of the locomotive derived from symptoms reported by the repair technician, or planned maintenance actions, or field modifications or upgrades. The recommendation can include suggested trouble shooting actions to further refine the repair recommendation and links to appropriate repair instructions, schematics, wiring diagrams, parts catalogs, and trouble shooting guides to make the diagnosis and repair process easier. Diagnosis information can be returned to the MDSC 20 in real time via the portable unit 14 for further analysis in the development and refinement of a repair recommendation. At the MDSC 20, expert systems, artificial intelligence tools, and case-based reasoning tools are used to develop the specific repair recommendations stored in the expert repository 42. These tools are discussed in greater detail in the commonly owned patent application entitled "Apparatus and Method for Performance and Fault Data Analysis" bearing patent application Ser. No. 09/629,597, filed on Jul. 31, 2000. The disclosure of this patent application is hereby incorporated by reference. For locomotives having an onboard monitor that generates a specific code for a specific operational fault, that code can be used to retrieve relevant diagnosis and repair information from the expert repository 42. The expert repository 42 can also include special procedures providing the technician with up-to-date procedures for performing certain tasks on the locomotive 12.

An operational parameter database 44 is the storage site for the operational data and information items that are transmitted between the monitoring and diagnostic service center 20 and the locomotive 12. The transmitted information, which is continually updated as new information is received, includes: fault codes, repair action feedback, repair action analysis, inspection results, operational information, and repair schedules. After recommendations are prepared at the MDSC 20, they are stored in the operational parameter database 44, while awaiting transmission to the portable unit 14 for implementation. Operation parametric trending information is also stored within the operational database 44. The trends can calculated by comparing operational values over a period of time and comparing those values with historical data or nominal data for similar or identical locomotives.

An inspection information database 46 stores information indicating planned inspection dates for the locomotive 12. The inspection schedule is unique to each individual locomotive, based on the locomotive identification or road number. When a locomotive is due for inspection, the appropriate inspection procedures, stored in the inspection information database 46, are transmitted to the portable unit 14. In one embodiment, the repair procedure includes feedback boxes for each inspection step. These feedback boxes are completed by the technician and automatically generate a summary inspection report that is saved in the repair information database 46 or printed for filing. Procedures for performing rail car and daily locomotive inspections are also stored in the inspection information database 46.

The inspection information database 46 further includes a wizards module to aid the inspection process. The wizards, which include standard inspection processes to identify locomotive problems, present the inspection process in a step-by-step procedure that eliminates guesswork on the part of the technician. Further, the technician is able to choose the order in which the inspection is conducted only if the individual inspection tasks are not interdependent. The wizards module further provides access to technical information in the expert repository 42 as necessary. In addition to the inspection wizards, maintenance wizards walk the technician through maintenance processes that need to be carefully controlled to ensure a quality result. The steps of the maintenance wizards are integrated with a repair or maintenance work order and may further utilize back-end information (i.e., e-training, technical manuals and schematics). The maintenance wizards also provides access to trouble shooting wizards as appropriate. The trouble shooting wizards isolate a problem to a specific part and then create a work order for the repair of that part.

Using the portable unit 14, the technician can enter a locomotive identification number or road number to retrieve a history of past repairs from a locomotive history database 50. A feedback feature associated with each repair task prompts the technician to enter certain information as repair steps are completed. This information is captured at the MDSC 20 and stored in the locomotive history database 50 to create a parts usage history and a record of the repair tasks completed. For example, a serial number and a description of each part used during a repair is retained within the locomotive history database 50. Each repair task has an appropriate closing code. The technician closes the repair using the appropriate code, after which the locomotive can be returned to service. The locomotive history database 50 includes three classes of repair: repairs not started, repairs in progress, and closed repairs.

Additional information available to the technician resides in a maintenance planning and scheduling database 52. Using this database, the technician can access railroad shop management tools and generate and modify locomotive maintenance and repair work orders and schedules. The technician can also access standard work orders and procedures and adapt them as necessary to a specific locomotive. Information concerning repairs in progress is also available in the maintenance planning and scheduling database 52, on a real time basis. Information about a specific locomotive's "health" is available from the maintenance planning and scheduling database 52 by checking the pending and forecast inspections and repairs. Pending repair or maintenance work orders stored in the maintenance planning and scheduling database 52 include an estimated repair time and the site where the repair is to be performed. Further, each standard repair process is assigned a repair code and each repair code has an associated repair time estimate. Collectively, this repair time information aids the railroad management with scheduling locomotives for return-to-service. The maintenance planning and scheduling database 52 further includes a safety-on-the job module providing easy and fast access to online safety rules and procedures.

The locomotive repair technicians have quick and easy access to accurate locomotive hardware and software version configurations via a configuration management information database 54. The hardware and software elements incorporated into a locomotive can be different, even within the same locomotive model. Thus, each locomotive is uniquely identified with a road number and the configuration management information database 54 allows retrieval of configuration information based on the unique locomotive road number. The technician needs accurate knowledge of the locomotive configuration before undertaking a diagnosis or repair. Heretofore, configuration information has been available only in paper form, and given the complexity of a railroad locomotive, the amount of paper describing the locomotive and its particular hardware and software configuration can be substantial, and difficult to manage and utilize. Also, the configuration management information database 54 advises the technician when software or hardware changes are required to upgrade the locomotive to the most recent configuration. The configuration management database 54 also includes all field modifications which alert the technician to suggested or mandatory modifications, including instructions for performing them for each locomotive, as issued by the locomotive manufacturer.

The configuration management database 54 also validates software application prior to loading into a specific locomotive 12. That is, if the software version is not compatible with other hardware or software components of the locomotive 12, approval for integration will not be granted. The configuration management database 54 can further identify the locomotive for which new software versions apply and can generate a work order for implementing that software version into the locomotive 12. As a result, software version incompatibility problems are avoided.

A repair information vault 56 includes a homepage address (e.g. a universal resource locator) for each repair code, with a link to repair instructions, schematics, parts catalogues, back shop manuals, operating manuals, drawings, trouble shooting guides, fault analysis manuals, maintenance manuals, video clips, still photographs, audio instructions, etc. All information in the repair information vault 56 is key word searchable by the technician (to avoid page-by-page searching), and all the data is linked (much like World Wide Web hyperlinks) for ease in navigating and locating the appropriate information. For example, acronyms and part numbers are linked to the applicable catalog in the parts-ordering module 58 discussed below. Retrieval of the technical documentation in the repair information vault 56 can be further limited to portions of a larger document to avoid overwhelming the technician with too much information. The repair information vault 56, in one embodiment, includes a road number navigator to provide a searchable field for retrieving relevant information stored within the information vault 56 by entry of the locomotive road number. The repair information vault 56 further includes a series of online skill-based tutorials ranging from the simplest to the most complicated diagnosis and repair tasks. For instance, the entry level tutorial may provide overall familiarization with the locomotive operating systems and the most advanced level teaches detailed analysis and diagnostic concepts.

The technical documentation included within the repair information vault 56 provides quick and easy access via visual-drill-down techniques to specific sections of the documentation, as required for a given repair. The searchable features offer easy access to specific technical information (e.g., torque values) to improve the accuracy and efficiency of repairs. Specific repair procedures can also be reviewed to improve the safety of the repair process.

The parts-ordering module 58 is also available to the technician via the portable unit 14. There are two types of parts orders: general inventory orders and repair orders. An online ordering system, included in the parts ordering module 58, allows direct parts ordering for inventory or for a specific repair, and access to the railroad's parts inventory to determine if the part is already available there. Repair parts ordered for a specific repair are matched with the locomotive configuration to ensure the correct part is obtained. The parts ordering module 58 also provides access to online catalogs issued by suppliers of locomotive components. General inventory orders are executed whenever the railroad's inventory for a part falls below a predetermined threshold. The parts ordering module 58 further includes easy-to-use visual navigation allowing the technician to drill down to pictures of a locomotive to pick a specific part without knowledge of the part number. Further, the availability of the required part is indicated and if available, the part can marked for delivery to the service yard 13.

The parts-ordering module 58 provides electronic inventory consumption recording so that inventory can be shipped from the supplier to the railroad operator or party responsible for the repair. The parts-ordering module 58 is integrated with the maintenance planning and scheduling database 52 to insure that parts required for scheduled maintenance activities are available in inventory just prior to the scheduled maintenance. This technique improves the forecasting of inventory purchases and assures that the parts inventory is maintained at an optimum level. Information regarding the number of parts in inventory and the location of such parts (for example, in the geographically distributed inventory shops maintained by the railroad or party providing repair services) is also available in the parts-ordering module 58.

Once parts are ordered, the ordered parts tracking module 60 allows tracking of all active and historical parts orders for a locomotive, e.g., whether shipped on back order and the quantity ordered. The tracking function can be driven by the locomotive identification number, by the order number or the part number.

A warranty information module 62 allows access to the applicable locomotive warranty documents. By entering a locomotive identification number, personnel can view all warranty information about that locomotive and its components. Warranty claims can also be submitted and tracked via the warranty information module 62.

A process improvement module 63 provides information and tools (such as data warehouse reports) to analyze the effectiveness of the repair process and the overall operations at the service shop 16. The process improvement module 63 also tracks cycle time for individual maintenance steps and for the execution of specific repairs.

A shop planning and scheduling module 64 provides current information and processes to plan the maintenance of a plurality of locomotives 12 at the service shop 16 or a service yard 13. The planning and scheduling module 64 also includes a monitor board or display for identifying the status of the implementation of the service recommendations on each locomotive in the service shop 16 or at the service yard 13.

All the databases and modules discussed above are available seven days a week and 24 hours a day from the portable unit 14. There is little or no human intervention required to access them, and thus around the clock availability is ensured.

In those embodiments and/or situations where it is necessary for the technician to extract information from the locomotive 12, the technician connects the portable unit 14 to a locomotive interface (e.g., an Ethernet connection) to communicate with the locomotive on-board monitoring system. The portable unit user interface guides the collection of information from the locomotive 12 and also provides memory for temporary data storage. Later, the data can be transferred to the railroad service shop 16 and/or to the monitoring and diagnostic service center 20. In one embodiment, the portable unit 14 includes a bar code scanner for reading the locomotive identification number, part numbers, and serial numbers. Use of a scanner for parts identification ensures accurate information feedback to both the parts ordering module 58 and the ordered parts tracking module 60. In another embodiment the portable unit 14 includes a camera for providing visual information back to the monitoring and diagnostic service center 20.

Figure 3:
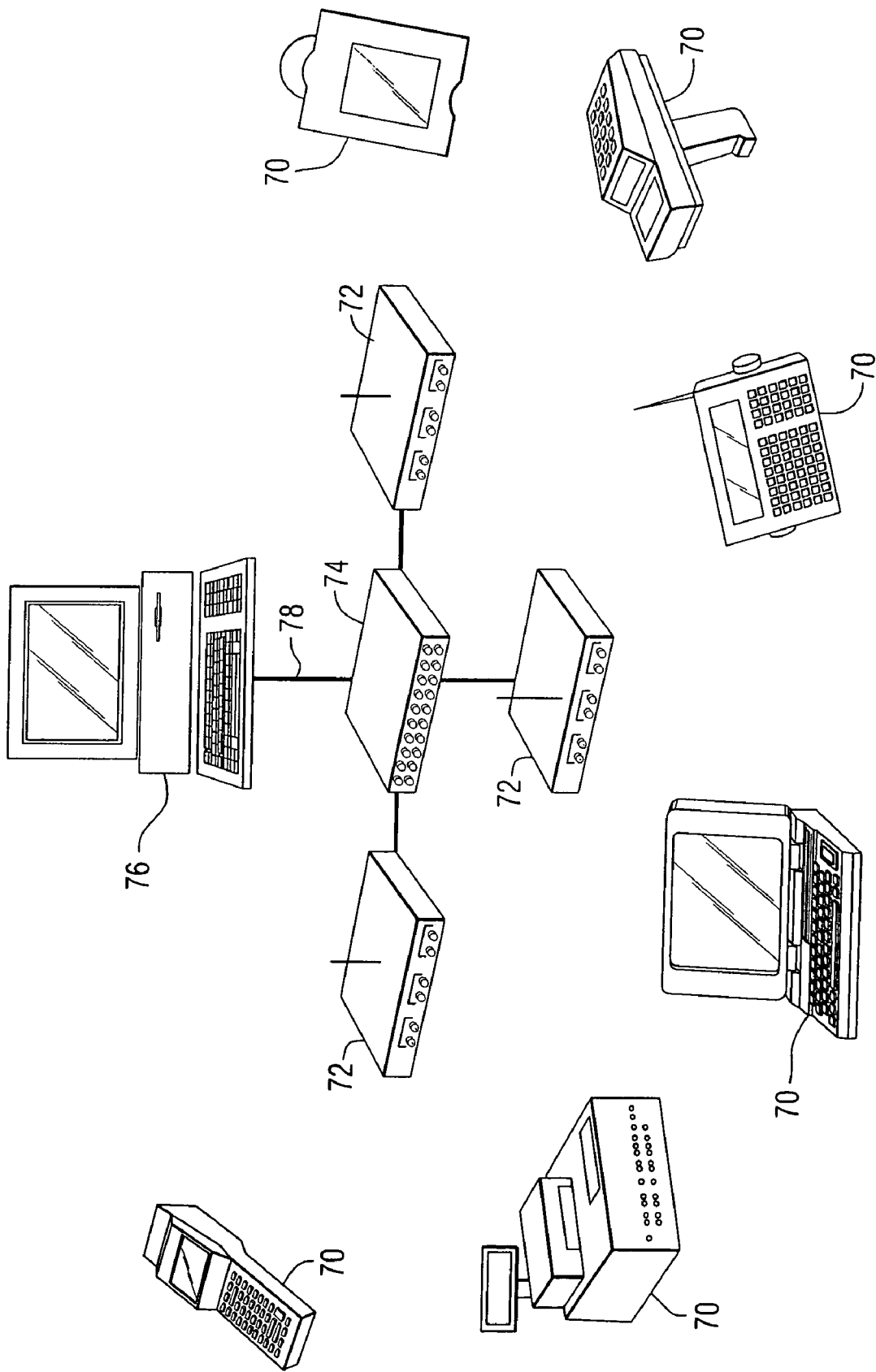
FIG. 3 is a pictorial rendering showing certain elements of a wireless embodiment of the present invention.

In one embodiment, the portable unit 14 functions as a stand alone device, performing the transactions discussed above without physical connection to a data portal. As shown in FIG. 3, the portable unit can comprise various styles and configurations, designated by reference character 70. The portable units 70 communicate via an RF wireless link, with one or more access points 72. The access points 72 is connected to an Ethernet hub 74, which then provides connectivity to a host server 76, via an Ethernet based media 78, employing, for example, the TCP/IP protocol. The access points 72 serve as both receivers and transmitters (i.e., transceivers) to both receive information from and transmit information to the portable units 70, including the information discussed above in conjunction with FIG. 2. In one embodiment, one access point 72 can support up to 400 portable units. Various data security measures, including encryption can be employed on the communication link. Use of a wireless link also allows easy expansion, as the wireless scheme can accommodate both small and large wireless networks, and does not require running new wires as the network expands. In another embodiment of the present invention, the portable unit 14 can be connected to a data communications line via a wire based medium, such as the land-based telephone system, a cellular system or a satellite based communication system. Although shown as a relatively simple device including a display, the portable unit 14 in other embodiments, may include a full size monitor, a keyboard, mouse, printer and/or other related input/output devices for enabling and expanding the interaction between the technician and the portable unit 14. Information is conveniently displayed on the portable unit 14 at the click of a mouse, the touch of a screen, a voice command, etc. dependent upon the specific operational features of the various portable units 70 illustrated in FIG. 3. In one embodiment, the portable unit 14 comprises a handheld ViA computer, loaded with the appropriate software applications, available from ViA, Inc., of Burnsville, Minnesota.

The portable unit 14 also offers an instant messaging feature allowing the technician to quickly communicate repair information (for example, fault codes, diagnostic readings, or simple descriptive text) to a repair expert at the monitoring and diagnostic service center 20. The repair expert can respond directly to the technician through the portable unit 14. This feature is intended for use during the collection of additional diagnostic information or when problems are encountered during the course of a repair.

Figure 4:
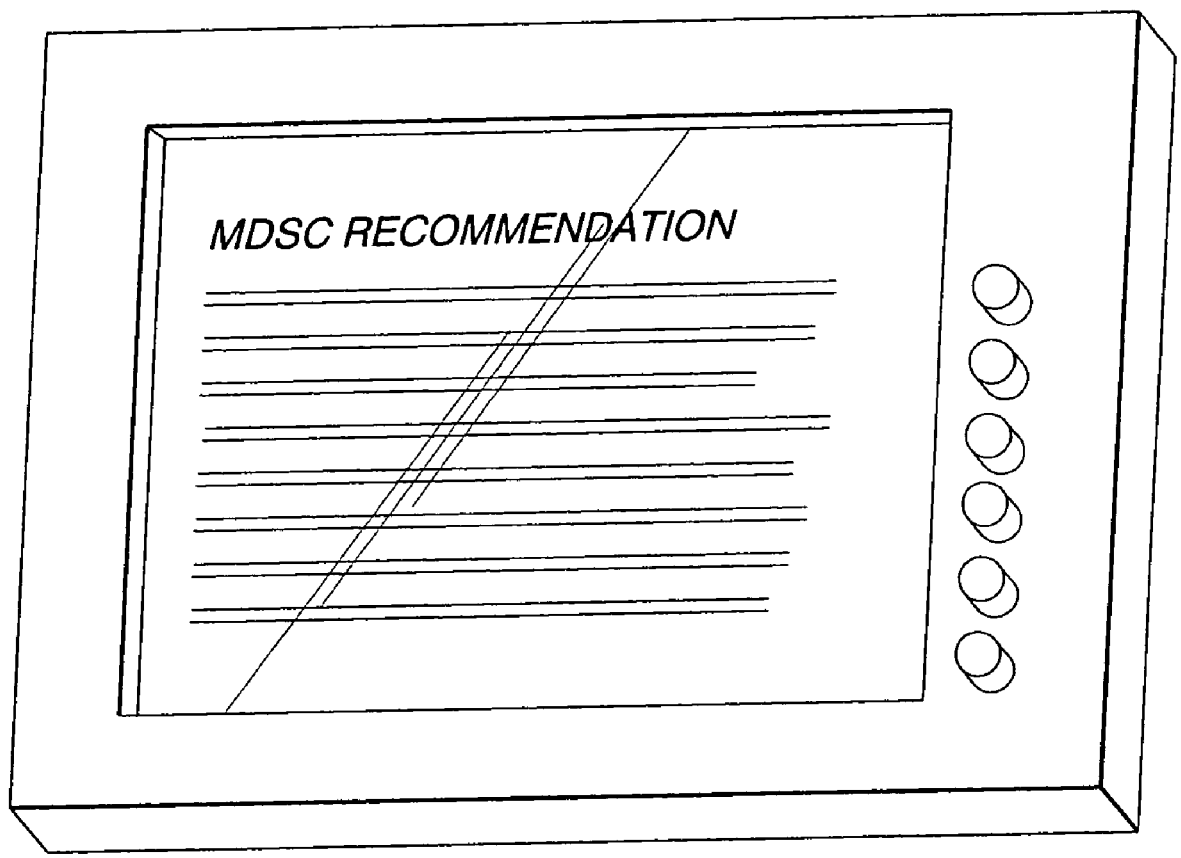
FIG. 4 is an exemplary screen display of a portable unit constructed according to the present invention.

The portable unit 14 includes a graphical user interface. An exemplary screen is shown in FIG. 4. The information is presented in a clear and concise style so that users with all ranges of experience can adequately use and understand the displayed information. The portable unit 14 offers short cut links to commonly used data and functions for experienced users, with more detailed instructional links for less experienced users. The portable unit 14 also has a back-out feature to move from the current screen to the previous screen, in this way leaving the user with no dead ends. Regardless of the locomotive that is undergoing repair, all applications and information on the portable unit 14 and all file formats, (no matter there origin from one of the many databases illustrated in FIG. 2) utilize the same presentation format and in this way their source will be transparent to the technician.

Figure 5:
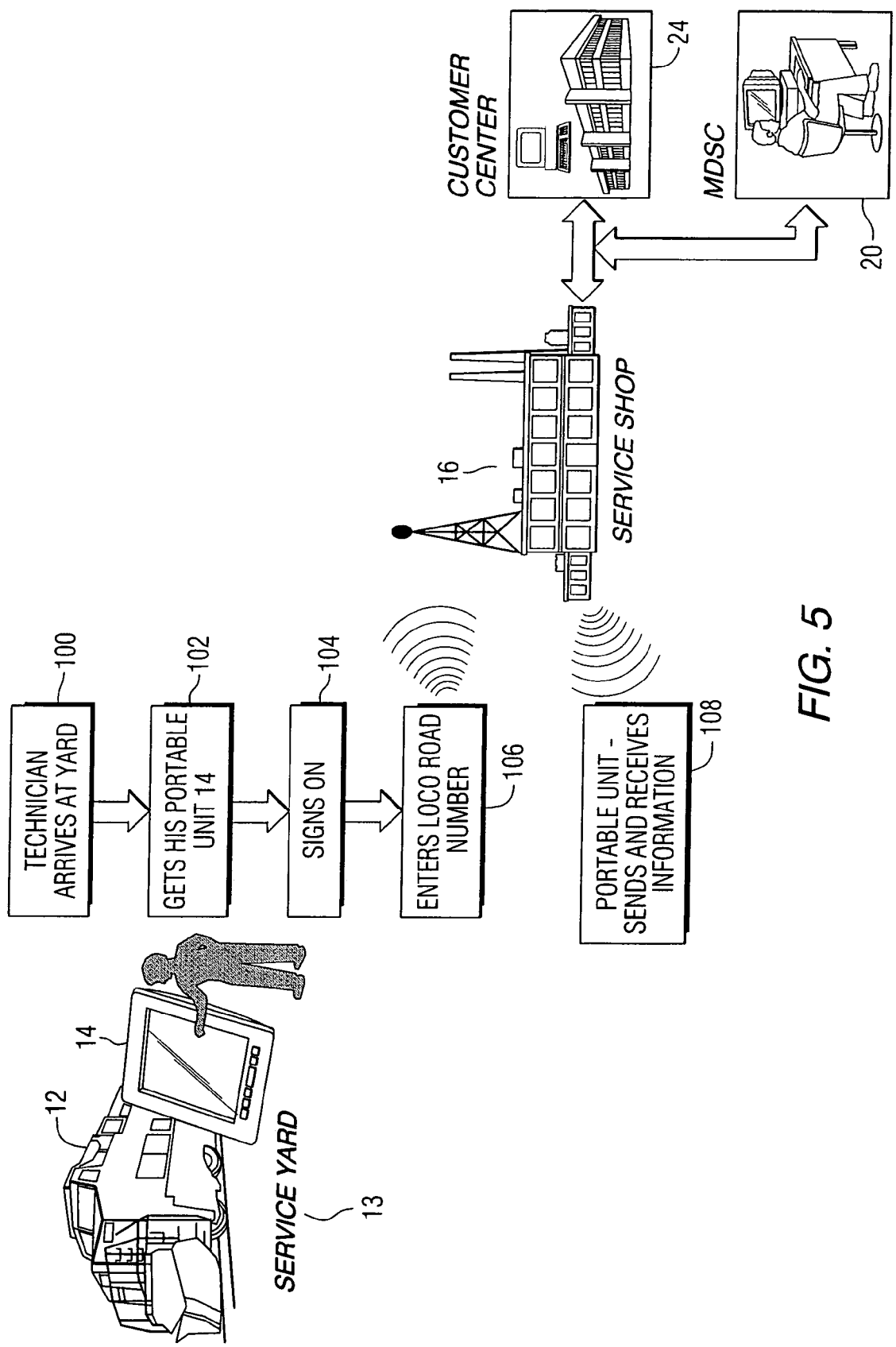
FIGS. 5 and 6 are simplified flow charts illustrating the repair process.
Figure 6:
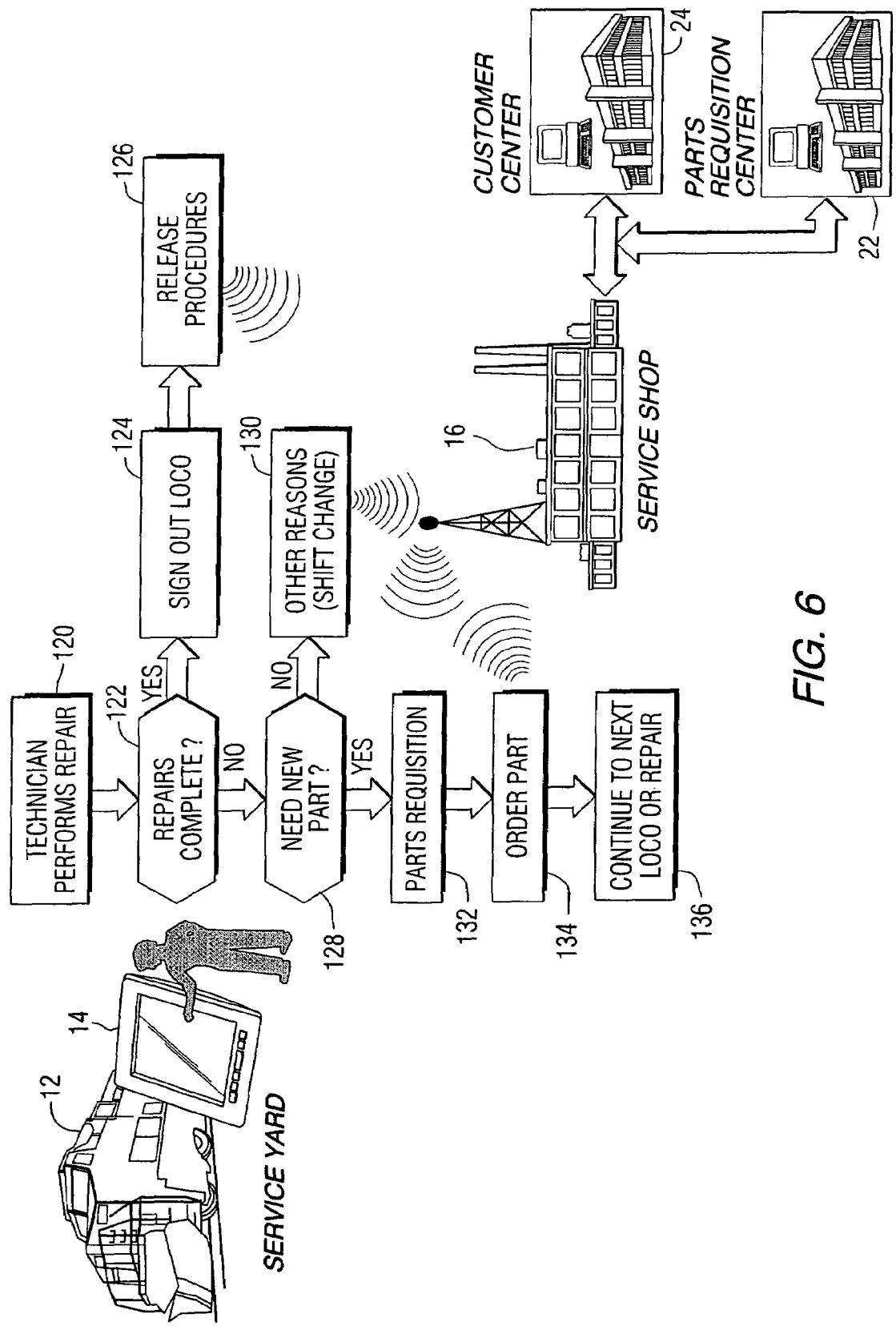

FIGS. 5 and 6 are flow charts showing the basic steps involved in implementing a service recommendation according to the present invention. Typically, the service recommendation is a recommendation for a repair, but the teachings of the present invention are not so limited. Service recommendations can also involve maintenance procedures or diagnostic processes with the objective of finding the root cause for a fault or anomalous condition. At a step 100, a technician arrives at the service yard 13 where the locomotive is parked. The technician retrieves his portable unit 14 (step 102) and signs on at a step 104. At a step 106, the technician enters the locomotive road number or other locomotive identification number, which is transmitted to the service shop 16. FIG. 5 illustrates this transmission through a wireless arrangement, although as is well known to those skilled in the art, there could also be a wire-based connection between the portable unit 14 and the service shop 16. The service shop 16 may then establish a communications connection with the customer center 24 and/or the MDSC 20. The portable unit 14 queries the MDSC 20 for information for the locomotive road number entered at the step 106. The technician may request any of the items discussed in conjunction with FIG. 2, such as repair or maintenance information, historical repairs, etc. Once the requested information is received at the service shop 16, it is sent to the portable unit 14, as illustrated at a step 108.

Information sent from the portable unit 14 to the MDSC 20 includes problems with a locomotive, the current status of locomotive systems, repair requests, diagnostic information and video clips and still photographs. Locomotive problems may be observed directly by the technician or downloaded from the locomotive on-board monitoring system as previously discussed. Information returned to the portable unit 14 from the customer center 24 and the MDSC 20 includes recommended repairs and relevant technical documentation required to perform the repairs as discussed in conjunction with FIG. 2. This information is displayed on the portable unit 14 to allow the technician to accurately and quickly repair the locomotive. The information displayed on the portable unit 14 includes a pictorial view of the locomotive and its constituent parts, repair steps, technical documentation relevant to the repair, and the tools necessary to perform the repair. Assembly diagrams and assembly instructions are also displayed. Multimedia information, such as video clips or audio instructions can also be transmitted to the portable unit 14 from the MDSC 20. In short, all information discussed in conjunction with FIG. 2 is immediately available to assist the technician with diagnosis, repairing and/or servicing of the locomotive.

Continuing to FIG. 6, a step 120 represents the technician's execution of the repair or service task. A decision step 122 asks whether the repair has been completed. When completed, processing continues to a step 124 where the locomotive is signed out from the repair site, either the service yard 13 or the service shop 16. At a step 126, release procedures are executed, after which the locomotive is returned to service. The release procedures involve confirming that all necessary steps required for return to service have been completed and generating a notice to railroad operational personnel that the locomotive 12 is ready to return to service.

If the repair has not been completed at the decision step 122, processing continues to a decision step 128, where inquiry is made as to whether a new part is needed to complete the repair. If a new part is not required, processing continues to a step 130 to determine why the repair has not been completed. For example, there may have been a work-force shift change during the repair process. In any case, the reasons why the repair has not been completed are communicated to the service shop 16 by the technician via the portable Unit 14.

If a new part is needed, processing moves from the decision step 128 to a parts requisition step 132, where, the portable unit 14 communicates with the service shop 16 to requisition the part. A step 134 is executed for those parts that must be ordered from a third party supplier, via the parts requisition center 22. Once the part has been ordered, the technician can continue the diagnostic and repair process for another locomotive or perform another repair on the current locomotive. This is illustrated by a step 136.

The electronic data delivery system of the present invention provides an improvement in the diagnosis, repair and maintenance of a mobile asset such as the locomotive 12 by applying E-business technologies to replace the prior manual paper-based processes. A benefit derived from applying these technologies includes improved availability of the mobile asset by reducing the cycle time of the repairs and more efficient and focused repair processes. Additionally, by using the various databases and modules illustrated in FIG. 2, the many processes related to a repair operation will be measurably improved in accordance with the teaching of the present invention.

Figure 7:
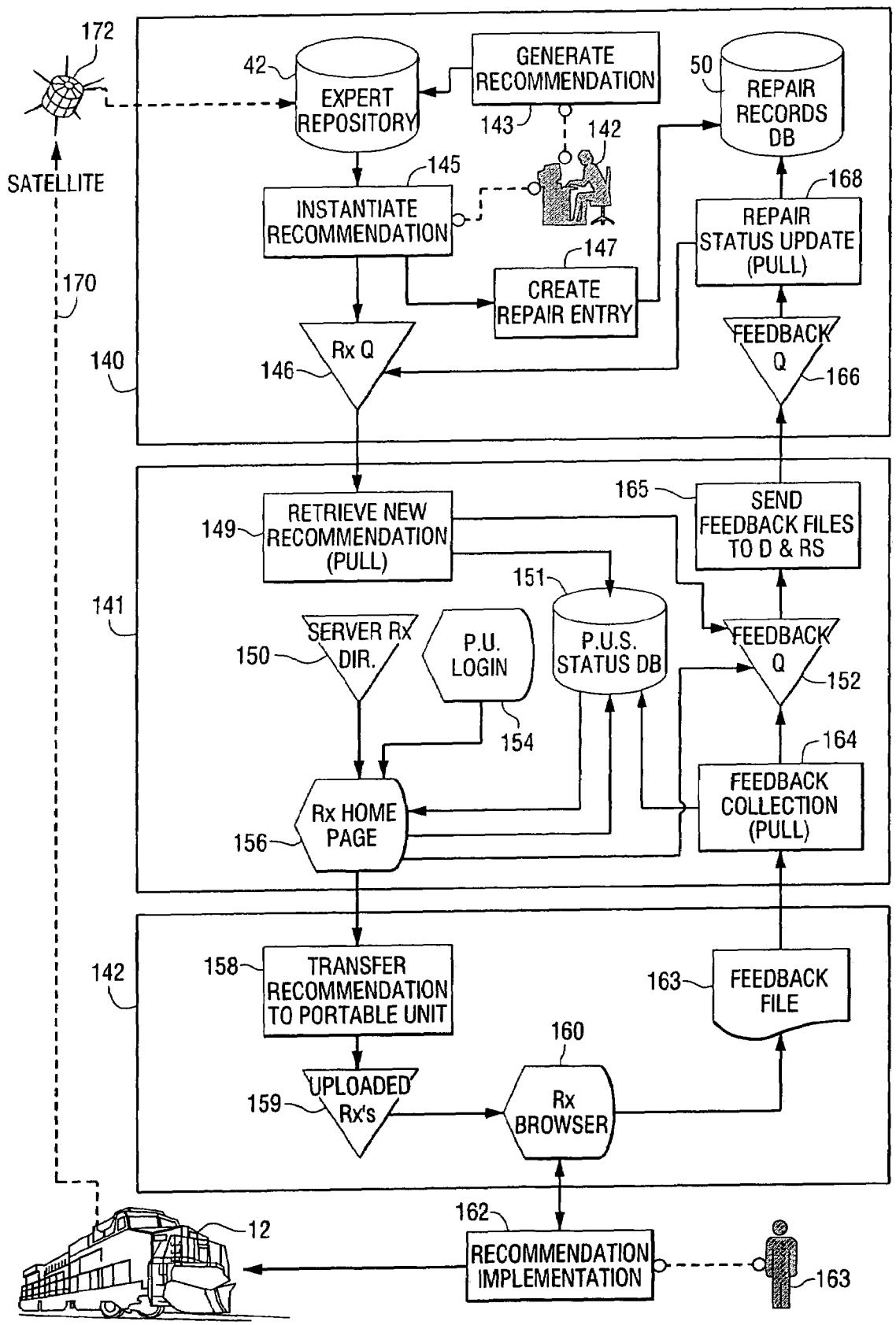
FIG. 7 is a flowchart of the recommendation authoring and repair execution process according to the teachings of the present invention.

FIG. 7 is a more detailed flow chart showing the primary steps involved in creating a repair recommendation and its implementation in a railroad locomotive. The figure illustrates the interrelationship between a diagnosis and repair system 140 located at the MDSC 20, a portable unit server 141, and the portable unit 14. A repair expert (see reference character 142) at the monitoring and diagnostic service center 20 creates a general recommendation as shown at step 143, based on parametric or fault data received from the locomotive on-board monitor or from the technician via the portable unit 14. This recommendation is entered into the expert repository 42, previously discussed in conjunction with FIG. 2. At a step 145, the recommendation is instantiated (i.e., a locomotive-specific recommendation is created based on the general recommendation) for a specific locomotive repair. The instantiated recommendation is placed on a recommendation queue 146 and also triggers the creation of a repair entry (see step 147) in the locomotive history database 50, also previously discussed in conjunction with FIG. 2.

The portable unit server 141, at a step 149, retrieves new recommendations from the recommendation queue 146. These recommendations are listed in a server recommendation directory 150. The recommendations are also input to the portable unit status database 151 and are used to create a feedback file in a feedback queue 152. When the portable unit 14 logs into the portable unit server 141 (see step 154), a recommendation home page is created at a step 156. The home page is based on the information in the server recommendation directory 150. At a step 158, the recommendations are transferred to the portable unit 14 and then at step 159 the recommendations are uploaded into a browser accessible directory in the portable unit 14. A step 160 depicts the technician's review and selection of one of the uploaded recommendations, using the browser application software. Finally, the repair recommendation is implemented on a locomotive 12 at a step 162 by a technician 163.

Following (and during) implementation of the recommendation, processing returns to the step 160 where the browser collects feedback information from the technician 163 (i.e., the technician 163 enters certain feedback information after the repair is completed or while the repair is in process) and loads it into a feedback file 163. The feedback file is later collected at a step 164 by the portable unit server 141. The feedback data is placed on the feedback queue 152 and sent to the diagnosis and repair system 140 at a step 165. Within the diagnosis and repair system 140, the feedback files are placed in a feedback queue 166 and at a step 168 loaded into the locomotive history database 50. Information can also be transmitted to and stored in the recommendation database directly from the on-board monitor on the locomotive via the communications path 170. For instance, this communication path could include a satellite communications link 172, or alternatively, a land-based wired link such as the public switched telephone network or a cellular link.

Figure 8:
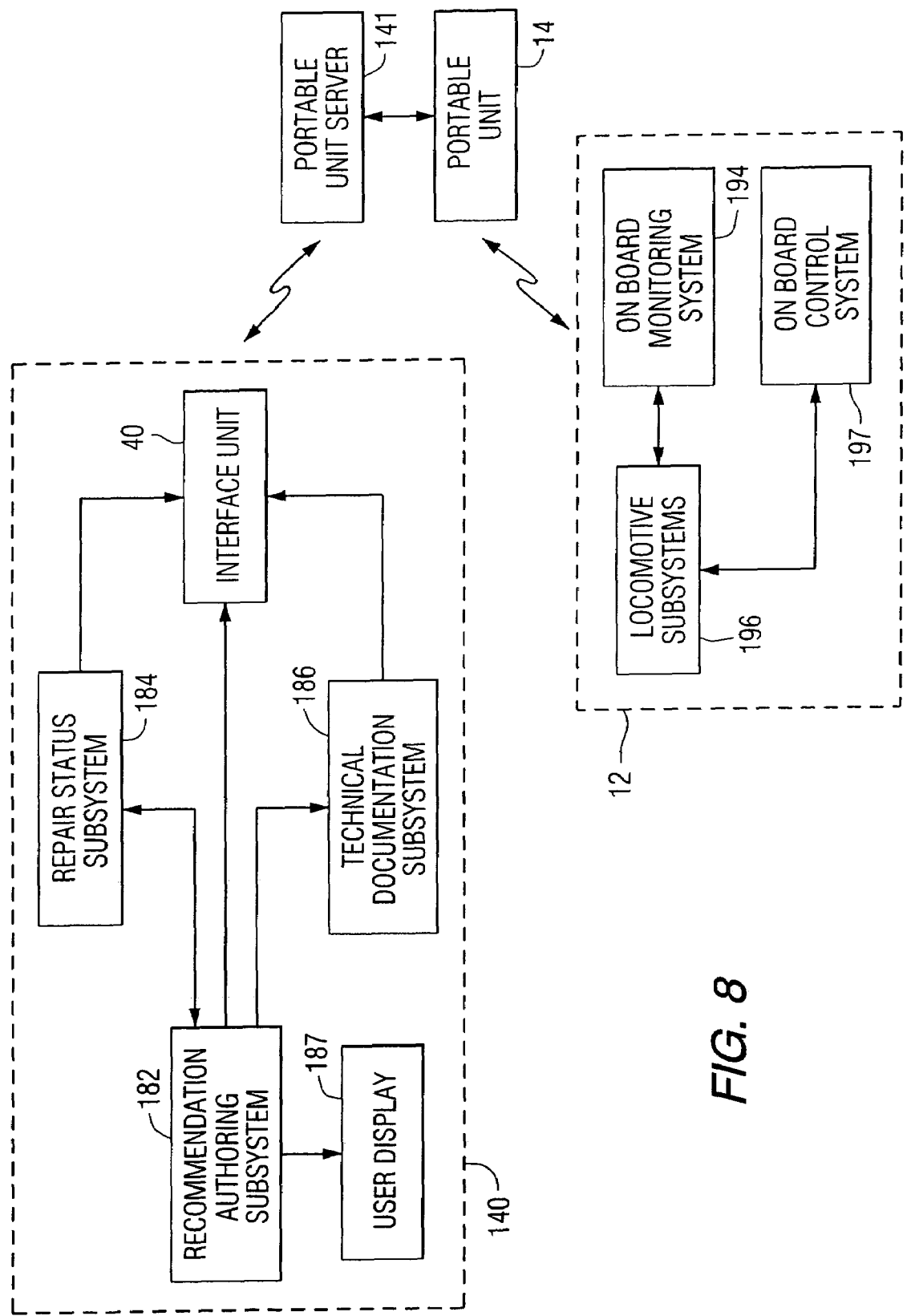
FIG. 8 is a block diagram of the principal components of a system constructed according to the present invention.

The diagnosis and repair system 140, the portable unit server 141, and the portable unit 14, constructed according to the teachings of the present invention are illustrated in FIG. 8. While FIG. 2 diagrammatically illustrates the individual databases and information sources accessible to the portable unit 14, FIG. 8 depicts the present invention from the system/subsystem level. The diagnosis and repair system 140 includes a recommendation authoring system 182, a repair status system 184, a technical documentation system 186, and the interface unit 40, previously discussed in conjunction with FIG. 2. With reference to the individual databases and information sources shown in FIG. 2, the recommendation authoring subsystem 182 includes the expert repository 42 and the operational parameter database 44. The repair status subsystem 184 includes the locomotive history database 50, the maintenance planning and scheduling database 52, the repair information vault 56, and the inspection information database 46. The diagnosis and repair system 140 communicates with the portable unit 14 via the portable unit server 141, as discussed in conjunction with FIG. 7. The communication link between the portable unit server 141 and the interface unit 140 can be either wired or wireless. Likewise, the portable unit 14 communicates (using either a wired or wireless media) with various components aboard the locomotive 12. In particular, the portable unit 14 extracts data from and provides data to an on-board monitoring system 194. Also, the portable unit 14 can query other locomotive subsystems, shown generally by a reference character 196.

The recommendation authoring subsystem 182 provides the functionality for authoring general repair recommendations and instantiating specific recommendations for a locomotive. The recommendation authoring system 182 provides the following functions: defining the steps involved in a repair, specifying the relevant technical documentation to accompany the repair recommendation and specifying the data that needs to be collected by the technician to execute the repair. The repair recommendation, instructions, and data to be collected are compiled into a cohesive deliverable package that is eventually delivered to the portable unit 14. In one embodiment, the compiled information is provided as a web formatted package. By using a web format (or other standardized format) the information can be displayed on the portable unit 14 in a standard format with which the technician will eventually become familiar. Consistency and familiarity with the repair information format allows the technician to efficiently navigate through the information provided and in this way increase his productivity. The key feature of the recommendation authoring subsystem 182 is the creation of repair-specific process steps (including all relevant technical documentation necessary to execute each step) for the technician. Using all the general diagnosis, repair and technical information available, the recommendation authoring subsystem 182 selects only that information needed for a specific repair as associated with a specific locomotive based on a unique locomotive designator, such as the road number, and presents this to the technician. With repair-specific information and back-up technical documentation readily available, the technician can more easily and efficiently execute the repair process.

The repair status subsystem 184 maintains and provides information on the status of a repair. This information is based on feedback provided by the technician during and after completion of the repair, as discussed above in conjunction with FIG. 7. The technical documentation subsystem 186 maintains the technical documentation for the locomotives and supports the selection and retrieval of the appropriate technical documentation into a repair-specific set of relevant technical documentation.

The portable unit server 141 disseminates repair instructions to the portable units 14 and collects information from those units as discussed above in conjunction with FIG. 7. Although only one portable unit 14 is shown in FIGS. 7 and 8, in fact, the portable unit server 141 can communicate with many portable units 14, as shown in FIG. 3. It is expected that each technician or team of technicians with service or repair responsibility will have a portable unit 14. The functionality provided by the portable unit server 141 includes: serving as a communications link to the interface unit 40, connecting with and identifying each portable unit 14 at power up, transferring feedback files from the portable unit 14 to the diagnosis and repair system 140, transferring the repair recommendations and relevant technical documentation to the portable unit 14, synchronizing clock times, validating the identity of the technician using the portable unit 14 and clearing files from the portable unit 14 once these files have been transferred to the portable unit server 141. In one embodiment of the present invention, the portable unit 14 can communicate directly with the diagnosis and repair system 140, thus rendering the portable unit server 141 unnecessary. In such an embodiment, the tasks performed by the portable unit server 141 are performed by the diagnosis and repair system 140 and/or by the portable unit 14.

The portable unit 14 displays the repair instructions to the repair technician and creates a record of the service event. Among the functions of the portable unit 14 are: providing a log in and log out interface, displaying repair instructions and all supporting technical documentation (including multimedia information), accepting repair feedback information and updating the repair feedback file when a repair action is finished and communicating with the locomotive 12 to extract information from the on-board monitoring system 194 and the other locomotive subsystems 196.

Turning now to a detailed discussion of each subsystem component, the essential function of the recommendation authoring subsystem 182 is to select general repair recommendations from the various sources available within the diagnosis and repair system 140 and to transform this information into a set of locomotive-specific, repair-specific instructions and relevant documentation. The recommendation and authoring subsystem 182, in one embodiment, is located at the monitoring and diagnostic service center 20. A general repair recommendation is those repair actions (i.e., a sequence of steps to be performed by the technician to execute the repair) that are responsive to a given set of fault codes. These fault codes are downloaded by the portable unit 14 from the on-board monitoring system 194 and the other locomotive subsystems 196, and provided to the recommendation authoring subsystem 182. The fault codes may also be communicated directly and automatically to the MDSC 20 from the on-board monitor, as discussed in detail in the aforementioned patent application entitled "On-Board Monitor for a Railroad Locomotive". In the present invention, the general repair recommendations are instantiated into a specific repair recommendation for a given fault that has occurred on a specific (i.e., road number) locomotive 12. A user display 187 is responsive to the recommendation authoring subsystem 182 for use by the repair expert 142 in formulating the repair recommendation.

The data entry objects used by the recommendation authoring subsystem 182 are generalized repair information, which later will be instantiated into a specific repair. Each data entry object is information or data related to a repair or repair step. For instance, one data entry object represents the initiation of a specific repair recommendation (by case number, locomotive road number or date of the repair). Another data entry object is the collection of part numbers for replacement (e.g., the old part number, the new part number, and a repair step identifier). And yet a third exemplary data entry object is signing off on a repair (e.g., an identifier for the final repair step or the identification number for the person signing off and indicating that the repair has been executed).

The technical documentation available to the recommendation and authoring subsystem 182 includes parts catalogs, maintenance manuals, schematic diagrams, fault code listings, and back shop manuals, and various multimedia files, such as video or audio instructional materials. This information represents typically-recommended documents needed for a repair. Specific pages and excerpts from this generalized documentation are identified by the recommendation authoring subsystem 182 when the recommendation is instantiated for a particular locomotive repair.

Figure 9:
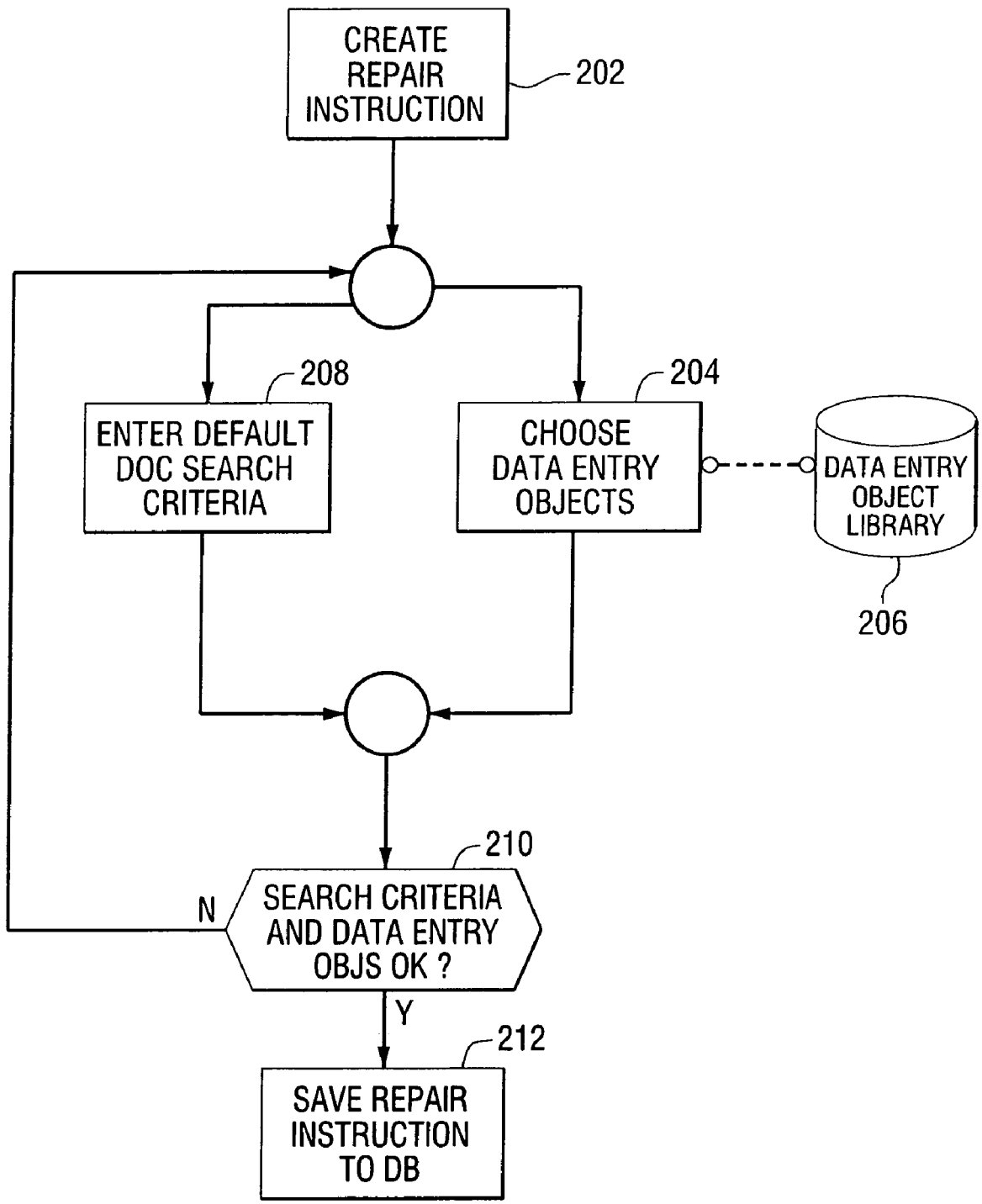
FIGS. 9–18 are process flow charts showing operational details of the present invention.

FIG. 9 is a flow chart depicting specific operations of the recommendation authoring subsystem 182. At a step 202, a generalized repair instruction is created by a locomotive repair expert 142 using his personal expertise and data analysis software tools, based on the locomotive parametric operational data, fault data and fault codes available to him. Exemplary tools are described in the patent applications entitled "Apparatus and Method for Performance and Fault Data Analysis", bearing application Ser. No. 09/629,597, filed on Jul. 31, 2000, and "Method and Apparatus for Diagnosing Difficult to Diagnose Faults in a Complex System", bearing application Ser. No. 09/609,469, filed on Jul. 3, 2000, both of which are commonly owned by the assignee of the present invention. These patent applications are hereby incorporated by reference. This repair instruction is a description of the steps or actions necessary to complete a repair. At a step 204, the relevant data collection objects (or data entry or data feedback objects, i.e., requests to the technician to enter specific data as the repair progresses) are associated with each repair step. This association or mapping includes the following elements: the repair step for which the data will be collected, the nature of data to be collected, and the location in the repair status subsystem 184 where the collected data will be stored. Anytime the repair expert adds or changes a step in the general repair recommendation created at step 202, the user display 187 shows a list enumerating the possible data entry objects that can be associated with that step. For each data entry object selected, the repair expert is offered another selection list of the various data store locations available for storing the collected data entry objects. The data entry objects and the data store location for storing the collected data are saved and stored in the repair status subsystem 184. The data entry object library is illustrated by reference character 206 in FIG. 9.

At a step 208, the repair expert enters default search criteria for locating relevant technical documentation. The objective is to associate each step of the repair process with the applicable technical documentation. But note to this point, only a general repair recommendation has been created; it has not been instantiated for a unique locomotive. Processing prompts the repair expert to select search criteria, including in one embodiment part number, part name, repair action (e.g., replacement, inspection), locomotive model number and documentation type. Based on the criteria selected, the recommendation authoring subsystem 182 interfaces with the technical documentation subsystem 186 to build a list of documentation applicable to each general recommendation repair step. Multimedia files can also be included within the selected documentation. To create this list, the technical documentation subsystem 186 searches its database for all documents satisfying the search criteria and identifies the locomotive road numbers to which the documentation applies, because later, when the repair is instantiated for a specific locomotive road number, this documentation will be retrieved based on the locomotive road number. The repair expert is presented with a summary of the documentation for each repair step, which comprises a documentation set, and he can view each set. In one embodiment, the information provided includes: a list of the road numbers to which each documentation set applies, the number of documentation pages and the number of links in the set (for evaluating the complexity of viewing and utilizing the set) and a total size of the files within the set (for evaluating the cost of downloading the set). In addition, the user is presented with total sizing information for the complete recommendation. This includes the total number of unique web pages and links across all the recommendation steps, and the total size of the documentation files that have to be transferred with the recommendation. The repair expert can then assess whether the volume of recommendation information is too large for efficient transfer to the portable unit 14 and/or for efficient use by the technician.

At a decision step 210, the repair expert determines whether the documentation and data entry objects are sufficient to adequately perform the repair. If not, processing returns to step 208 where additional documentation can be identified. If the data entry objects and documentation are sufficient, processing moves to a step 212 where the repair instruction, the data entry objects for each step, and the documentation for each repair step are saved to the expert repository 42.

Figure 10:
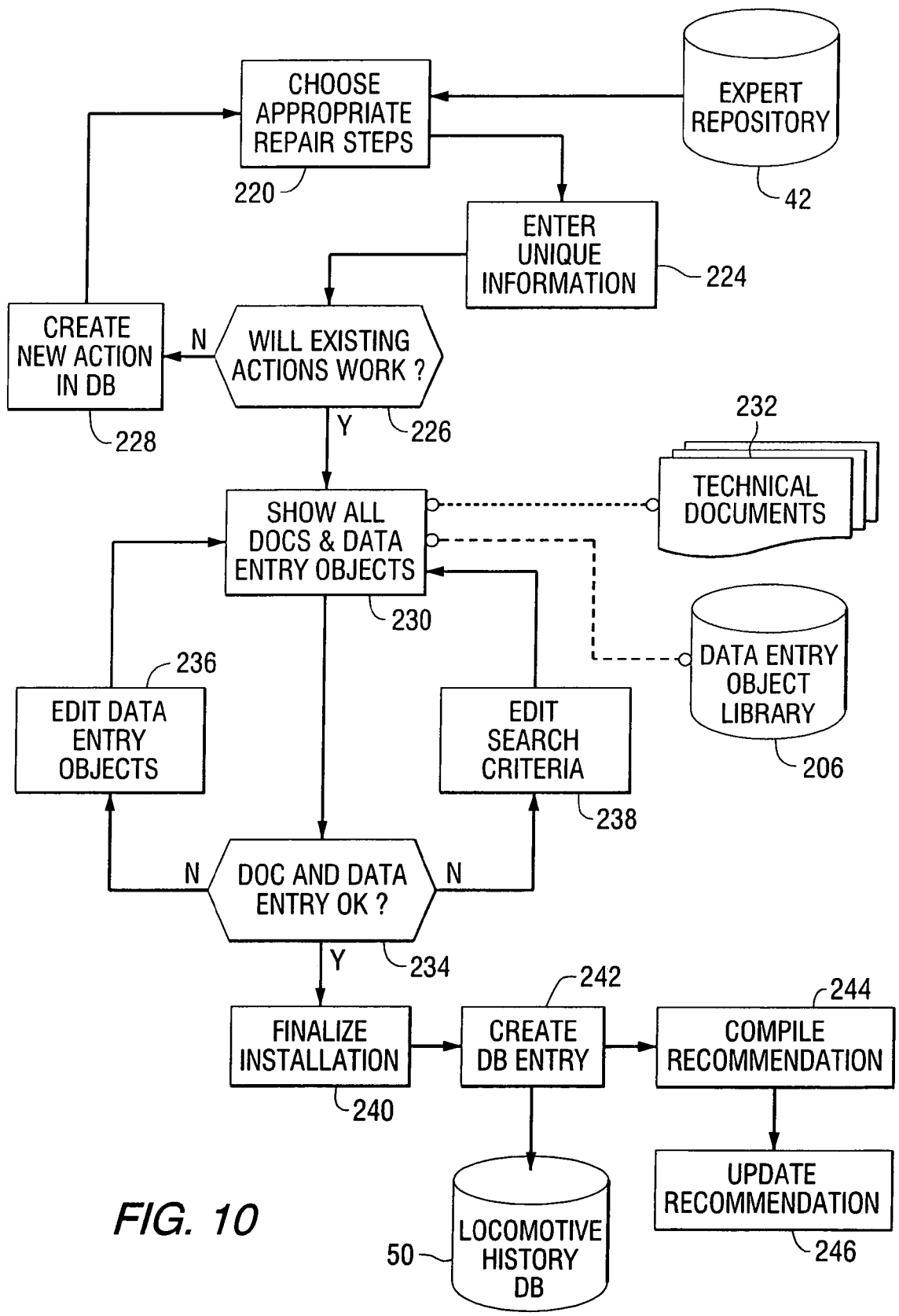

FIG. 10 illustrates the process of instantiating a specific repair recommendation from the general repair recommendation created in FIG. 9. At a step 220, a repair step is chosen from the expert repository 42 as an initial step. At a step 224, unique locomotive information is entered so that the general repair can be instantiated. This unique information is the locomotive road number or another unique locomotive designator. At a decision step 226, the expert user reviews the instantiated recommendation. If additional repair steps, data entry items (i.e. feedback items from the technician) or documentation is needed, processing loops back to the step 220 via a step 228, where processing allows the creation of new repair steps and the addition of data entry items and technical documentation. If the repair expert determines that the existing repair steps are sufficient for the specifically-identified locomotive, processing moves from the decision step 226 to a step 230 where the technical documents and data entry objects that will accompany the recommendation are reviewed by the repair expert. The technical documents are shown generally by reference character 232. The data entry objects are retrieved from the data entry object library 206. From the step 230, processing moves to a decision step 234 for determining whether the technical documentation and data entry objects are sufficient. If the data entry objects are not satisfactory the repair expert can edit the data entry objects as shown by a step 236. If the technical documentation is not satisfactory, the repair expert can edit the technical documentation search criteria as shown at a step 238, so that additional technical documentation can be retrieved. To this point, the process of FIG. 10 preserves the data entry object mapping that was defined at the step 204 in FIG. 9. If, however, the repair expert adds any steps to the repair recommendation, he will be prompted to map data entry objects to the new steps. This also occurs at the step 236.

Recall that for each step in the repair recommendation, there is associated a technical documentation search criteria that was created by the search process at the step 208 in FIG. 9. At the step 238 in FIG. 10, first a request is initiated to retrieve all the technical documentation that matches the search criteria for the instantiated recommendation. The search returns a list of the pages satisfying that criteria. The diagnosis and repair system 140 displays a summary of the technical documentation pages for each repair step and the summary of the technical documentation pages for the entire recommendation. The summaries will include: the number of pages to be retrieved for each documentation type, the number of links between the documentation pages, and the size of the files that will have to be downloaded to the portable unit 14. At the step 238, the repair expert can then view the documentation pages that satisfy the search criteria, expand or constrain the search criteria, select specific pages, and omit other pages as desired. Finally, at a step 240, the instantiated recommendation is finalized by the repair expert.

At a step 242, the repair status subsystem 184 is triggered and an entry is created in the locomotive history database 50 for the instantiated recommendation. If an entry had previously been created for this specific recommendation number, then a new entry is created with a unique revision number. In one embodiment, the unique revision number can be derived from the date and time of the instantiation. At a step 244, the recommendation is compiled. This function, carried out within the recommendation authoring subsystem 182, involves pulling together all the repair steps, web pages, technical documents, and data entry items for the recommendation and placing them in the recommendation queue 146 (see FIG. 7) for retrieval by the portable unit server 141. The step 244 involves many processes including the following. A top level web page is generated for the recommendation. The top level page contains the case number, railroad case number (if one is assigned), date of the recommendation, due date for the repair, locomotive road number, service yard or service shop where the repair is to be performed, and a brief overview of the repair. A web page listing all of the repair steps is also generated. As appropriate, each step is linked to one or more data entry objects for collecting the feedback data associated with that step. These data collection objects will prompt the technician to enter data pertaining to each repair step as the repair proceeds. If the repair status subsystem 184 already contains information about the repair, because the repair was partially completed and reported in a prior session, the data entry objects already in the repair status subsystem 184 will appear as the initial values in the data collection objects.

The functionality of the viewing application on the portable unit 14 (and, therefore, the data entry objects) must be such that any values entered via the viewing application are persistent. Persistence is required in case the viewing application on the portable unit 14 shuts down before the repair-close function is performed at which time the data entry objects are transferred to the feedback collection file 164 of the portable unit server 141. The persistent values are displayed to the technician whenever the data entry objects are reactivated on the portable unit 14. The persistence can be achieved by writing the data entry objects to a local file on the same directory as the web pages (and optionally backing them up in another file area, such as on a flash memory card). The web entry mechanism always populates the initial values with the values from this stored data file and immediately updates this file with any new values that have been entered. The data entry mechanism also date and time stamps the data entry objects as they are collected.

Each data entry object includes an indicator of the repair step with which it is associated and the location where the data entry object is to be stored in the repair status subsystem 184. In one embodiment, the data entry objects include only rudimentary error checking features. For example, if the data entry object is to collect a date, it will verify that a valid date was entered. If the data entry object is to collect a part number, it will verify that the value entered is in a part number format. In another embodiment, the data entry objects can offer more sophisticated error checking. For example, if the data entry object requests a part number, a parts catalog will be checked to verify that the entered part number is a valid part number for that repair.

The process of compiling the recommendation also creates a repair file that records the reason for closing out the repair. This file is later transferred to the portable unit server 141 from the diagnosis and repair system 140. Following are the possible reasons for closing out the repair. A completed repair indicates that the railroad does not intend to do any further work with respect to the repair recommendation. It is possible that all steps of the repair have not been executed, but as far as the railroad operations are concerned, the recommendation can be closed. The repair can also be halted temporarily and later resumed. In this case, the technician will be prompted to indicate why the repair has been halted. A default list of legitimate reasons, with a text box for allowing the user to enter a free-text explanation, is displayed. Among the default halt reasons are: shift change, waiting for parts, locomotive placed back in service temporarily, locomotive being transferred to a new location, locomotive being transferred to a different rail yard. The repair-close function is triggered via a button on each page where repair steps are listed. Additionally, it will be triggered whenever the technician closes down the repair viewing application or when he tries to view a new set of repair instructions. In any case, whenever the technician closes a recommendation, the system will ask whether the repair has been completed. Based on the technician's response, the repair will be tagged as complete or halted.

The compile-recommendations step 244 of FIG. 10 also includes the process of compiling all technical documentation and multimedia presentations into a deliverable set of web pages and linking the documentation pages to the repair steps. It is also necessary to adjust the referring links within the documentation pages so that they will work locally on the portable unit 14.

Finally, at a step 246, the status of the recommendation is updated in the repair status subsystem 184. Recommendations that have been completed are deleted and all recommendations that have been halted are maintained in the recommendation queue. The repair status subsystem 184 provides a list of recommendations and their status to update the recommendation queue 146.

As discussed above in conjunction with FIGS. 9 and 10, the recommendation authoring system 182 interfaces with the technical documentation subsystem 186 to locate technical documentation and multimedia presentations relevant to the recommendation. The recommendation authoring system 182 provides search criteria to the technical documentation subsystem 186 for retrieving relevant documentation. Included within the search criteria are one or more of the following: part name, part number, action name, repair fault code, and locomotive model. Search scope information is also provided to the technical documentation subsystem 186 for specifying where to look for relevant documentation. Included within the search scope are parts catalogs, maintenance manuals, schematics, back shop manuals, fault analysis pages, field modification instructions, and multimedia files. In response to the inputs, the technical documentation subsystem 186 responds to the recommendation authoring system 182 with the location of the technical documentation that satisfies the search criteria. The output is a list and each entry in the list contains the following information about that entry: location of the page (for subsequent retrieval), size of the file making up the page, the type of page (i.e., the document source), and the locomotive road number or numbers to which the page applies.

Another interface between the recommendation authoring subsystem 182 and the technical documentation subsystem 186 provides access to a browsing mechanism within the technical documentation subsystem 186. This browsing mechanism allows the repair expert to review the documentation pages to determine if it is necessary to refine the search criteria.

As illustrated in FIG. 8, the recommendation authoring subsystem 182 also interfaces with the repair status subsystem 184. The recommendation authoring subsystem 182 allows selection of existing general repair recommendations for a specific problem or repair code. Also, the recommendation authoring subsystem 182 inputs a summary of the repair recommendation to the repair status subsystem 184 so that the latter can create an entry in the repair status database for each repair. The repair status subsystem 184 responds to the recommendation authoring subsystem 182 when the repair entry is created. The transmitted summary includes:

the repair case number, the date and time that the recommendation was issued, the road number to which it applies, the steps outlined in the repair recommendation, the technical documentation to accompany each repair step, and the repair status. The recommendation authoring subsystem 182 also provides to the repair status subsystem 184 the data store locations for the data entry objects. The purpose of this input is to ensure that the data store locations are recognizable by the repair status subsystem 184.

Repair steps in an instantiated repair recommendation fall within two categories: coded repair steps and free text repair steps. Because they are easier to use in authoring a recommendation, coded repair steps are preferred. When the repair expert defines a repair step in a general repair recommendation, he selects the repair action from a predefined list of coded repair steps. Alternatively, the expert user can bypass the selection list and enter a description of the repair action in free text. Free text based steps are not mapped to numeric repair codes.

The repair status subsystem 184 also supplies a list of possible locations for storing the values collected by the data entry objects. The repair status subsystem 184 stores these values when they are received following an actual repair event, as part of the repair feedback process.

The technical documentation subsystem 186 maintains the technical documentation repository and supports the selection and retrieval of technical documentation into a repair specific set of relevant documents by the repair expert. In one embodiment, the technical documentation is available in a web-based format. The technical documentation subsystem 186 supports the retrieval of individual pages or sections from technical documents, rather than retrieval of the entire document. The technical documentation is also indexed. These indexes provide quick identification of document subsets. For example, the indices can support identification of all documentation pages related to a specific part number, a specific part name, or a repair process name. All relevant technical documents are stored in the technical documentation subsystem 186. The stored documents are: parts catalogs, wiring and parts schematics, maintenance manuals, fault analysis pages, back shop manuals, field modifications instructions, training instructions, part identification animations, assembly animations, etc. The documentation includes both text, graphics, and visualization based documents. Thumbnail style summaries may be included with each document.

The files of the technical documentation subsystem 186 can be remotely browsed. That is, a user logged in to a network computer connected to the diagnosis and repair system 140, but not necessarily the machine hosting the technical documentation subsystem 186, can search for pages, view pages, follow links between pages, and copy pages to a local file.

The technical documentation subsystem 186 supports a search mechanism based on one or more of the following criteria: part name, part number, action name, fault code, locomotive model, and document type. Search results are presented in the form of a summation of the search results, with pointers to the actual pages so they can be retrieved on demand. The technical documentation subsystem 186 also supports the retrieval of individual document pages or document sections from its files. The retrieval process copies the retrieved pages to the user's application. The retrieval mechanism automatically adjusts hyperlinks between the copied pages accordingly.

The technical documentation subsystem 186 receives two types of inputs from the recommendation authoring system 182. These include search criteria and search scope. Search criteria refers to one or more of the following: part name, part number, action name, fault code, or locomotive model number. The search scope refers to parts catalogs, maintenance manuals, schematics, back shop manuals, fault analysis pages, and field modification instructions.

The output from the technical documentation subsystem 186 is the list of all the technical documentation pages satisfying the search criteria. Each entry contains the following: the location of the page (for subsequent retrieval), the size of the file that makes up the page, the type of page (that is, the document source), and the locomotive road numbers to which the page applies. The recommendation authoring subsystem 182 can also access the technical documentation subsystem 186 for generalized browsing of the files. This feature allows a user to browse the documentation pages to determine the appropriate search criteria to use.

Figure 11:
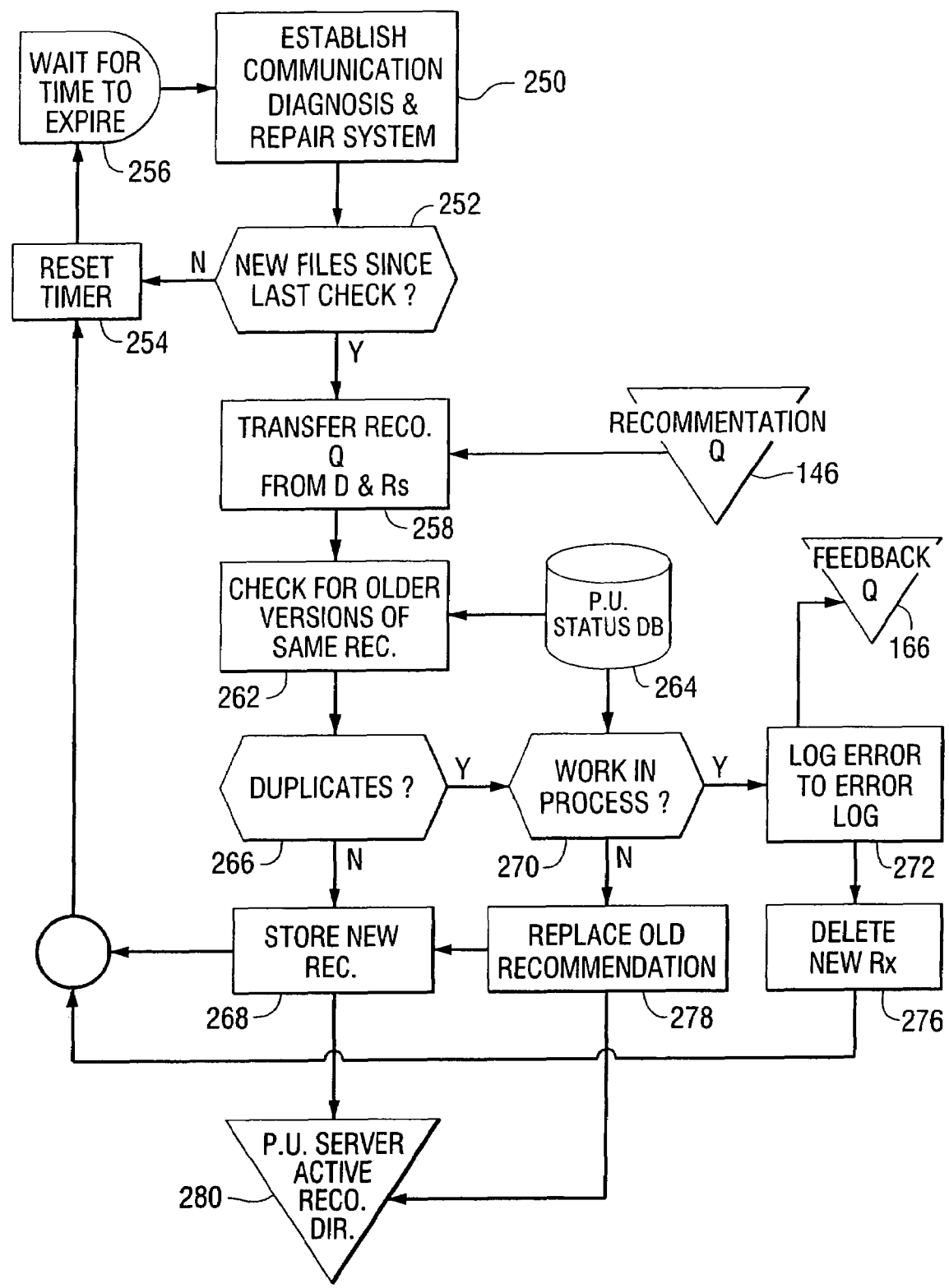

The portable unit server 141, to be discussed in detail in conjunction with FIG. 11, provides the functionality for disseminating repair instructions from the diagnosis and repair system 140 to the portable unit 14 and collecting repair information (i.e. date entry objects) back from the portable units 14. Functions provided by the portable unit server 141 include: connecting with the diagnosis and repair system 140, connecting with and identifying each portable unit 14 when it is powered up, automatically transferring repair feedback files from the portable unit 14, transferring the repair recommendation home page, selected directories and the technical documentation related to the repair to the portable unit 14, synchronizing clock times, validating the identity of the technician and transferring all feedback files (i.e. date entry objects) to the diagnosis and repair system 140.

The portable unit server 141 uses the following data concepts: specific recommendation directories, user identity files, portable unit status databases and home page files.

The recommendation directory is the location of web-deliverable, linked packages of repair instructions and technical documentation (including multimedia files) provided by the diagnosis and repair system 140 for each repair recommendation. This information is transferred to the portable unit server 141 and filed there. Each recommendation directory has a standard file format and architecture that allows the portable unit server 141 to read summary information about the repair recommendation.

Each repair home page begins with a summary of the repair steps and their corresponding feedback or data entry objects. From these original repair actions, the technician can drill down to more detailed information about the repair steps via links. In one embodiment, there is always a one-click path back to the original repair action from the deeper links. Once the repair step has been completed and appropriate feedback information obtained and recorded, the next step in the repair process is displayed, with links again to supporting documentation.

The user identity file, used by the portable unit server 141 as a data concept, contains names of all technicians registered to use the portable units 14. When a technician logs on, the identity entered in the log in box is checked against the identities stored in the portable unit server 141. If the identification is not in the file, the technician is asked to re-enter the identification information. The portable unit server 141 also includes a portable unit status database containing information about the deployment of each portable unit 14.

Each repair recommendation has a structure that includes the following data: the recommendation identification number, the recommendation status, the technician identification number, the portable unit identification number, the log in time when the repair began, and the log out time when the repair was finished. Each repair recommendation has a file containing this information.

The last data element used by the portable unit server 141 is the home page list of recommendations. The home page list is the initial file displayed on the portable unit 14 when a technician logs on. The home page file includes a list of the currently active recommendations with: the locomotive road number, the repair technician identification number, the repair status, and a short description of the repair. A technician selects a specific recommendation from the home page file for transfer to his portable unit 14, at which time the specific recommendation directory is transferred to the portable unit 14. Whenever any data related to an active repair recommendation is changed, the home page file is automatically modified to reflect the change.

FIG. 11 is a flow chart illustrating operation of the portable unit server 141. At a step 250, communications is established with the diagnosis and repair system 140. Exemplary communications schemes include: satellite communications, cellular telephone, the public-switched telephone network, the Internet, an intranet or a wireless or wired local area network. This link is used to transfer repair recommendations into the portable unit server 141 and to transfer repair feedback information back to the diagnosis and repair system 140. At a decision step 252, the portable unit server 141 queries the diagnosis and repair system 140 to determine whether any new repair recommendations have been created since the last download. If no such files have been created, processing moves to a step 254 where a timer is reset. During a step 256, the timer runs and upon expiration, processing returns to the step 250 where the communication link is again established with the diagnosis and repair system 140 to check for new repair recommendations.

If new repair recommendation files have been created since the last inquiry, processing moves from the decision step 252 to a step 258 where the portable unit server 141 downloads the new repair recommendations (and updates to existing repair recommendations) that were instantiated after the last check (i.e., any recommendations that are not yet stored on the portable unit server 141). The downloads are made from the recommendation queue 146 in the diagnosis and repair system 140 (see FIG. 7) where new repair recommendations and repair recommendation updates are stored. When a new recommendation is transferred to the portable unit server 141 from the diagnosis and repair system 140, it is processed as follows. At a step 262, the portable unit server 141 checks for prior versions of the same recommendation. To perform this function, it must access the portable unit server status database, represented by reference character 264. At a decision step 266, a determination is made whether the downloaded repair recommendation is a duplicate. If there is no prior version, then the recommendation is stored in the active recommendation repository (or directory) of the portable unit server 141. This action is represented by a step 268.

If there is a prior repair recommendation, then processing proceeds to a decision step 270 where a determination is made whether the prior repair recommendation is active (i.e., in progress). An active repair is one that has already been transferred to a portable unit 14. If the older version of the repair is active, then an error is logged to the error log database of the portable unit server 141. This process is represented by a step 272. Also, an error entry is created in the feedback queue 166 (see FIG. 7), which will eventually be transferred to the feedback file of the diagnosis and repair system 140, as indicated by a step 274. Finally, the new version of the repair is deleted at a step 276. Any errors that might occur due to the use of an outdated recommendation will be analyzed at the monitoring and diagnostic service center 20. Alternatively, in yet another embodiment, the portable unit server 141 can contact the portable unit 14 to advise the technician that a more recent repair recommendation is available.

If the older version of the repair recommendation has not yet been transferred to a portable unit 14 (i.e., it is not an active repair) then the older version is deleted, as indicated at a step 278. The portable unit server active repair directory (shown by reference character 280) is accessed at the step 268 for storing new repair recommendations. All recommendation information in the portable unit server active repair directory can be displayed on a kiosk (not shown in FIG. 11) located at the service shop 16 or the service yard 13. Interested parties can view the display of active recommendation for the purpose of managing the various assets of these service facilities. Information available at the kiosk can also be printed in hard copy form. Further, the functionality of the portable unit 14 is also available at the kiosk.

The portable unit server 141 uses a timing mechanism to trigger the transfer of information from the recommendation queue 146 of the diagnosis and repair system 140. Note that there is an input to the reset timer step 254 from both the step 268 where new recommendations are stored, and from the step 276 where new recommendations are deleted. Each of these input signals resets the time at the end of a data transfer. This technique ensures that a prolonged data transfer will not overlap with the next timing trigger.

Figure 12:
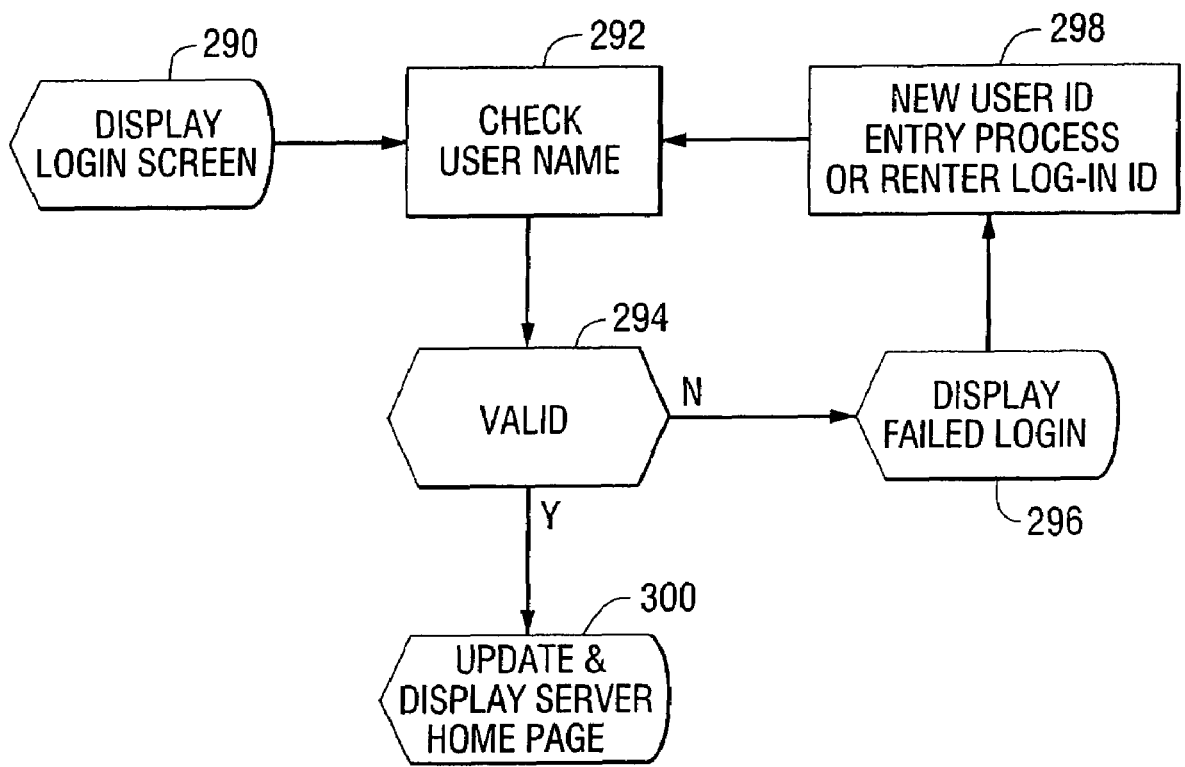

The FIG. 12 flow chart illustrates the process of logging on to a portable unit 14. At a step 290, a log in screen is displayed on the portable unit 14 and the repair technician enters his/her identification number. At a step 292, the portable unit server 141 checks the identity of the technician and also the Internet protocol address of the portable unit 14, in those embodiments where the TCP/IP protocol is utilized as the communications vehicle between the portable unit server 141 and the portable unit 14. If the technician is not a valid user, processing moves from a decision step 294 to a step 296 where a failed log-in message is displayed on the portable unit 14. The technician is prompted to re-enter his/her log-in identification at a step 298. If the technician is a new (i.e., not previously authorized) user, then an authorization process is executed at the step 298. Once the technician has been identified as an authorized user or a new authorized user, processing moves from the decision step 294 to a step 300 where the repair recommendation selection home page is downloaded from the portable unit server 141 and displayed on the portable unit 14.

The recommendation selection home page, on the portable unit server 141, is updated on a periodic basis and whenever new recommendations are created or existing ones are changed. Recommendations that have already been transferred to the portable unit 14 (for execution of the repair) show a "transferred" status. The operator of the portable unit server 141 can transfer already-transferred recommendations to another portable unit 14, but will be warned that the recommendation is already active on another portable unit 14. An indication of the repair status is also included on the home page. Following is a list of the possible repair statuses: the repair has not been transferred to a portable unit 14, the recommendation has been transferred but no repair data has yet been received (in this case, the status indicator will also show which portable unit has received the repair recommendation and identify the service technician who selected it), a partially complete set of repair data has been received from the portable unit 14, and an apparently complete set of repair data has been received and is in the process of being transferred back to the diagnosis and repair system 140.

The operator of the portable unit 14 can limit the recommendations that are presented to those satisfying specific criteria. The available search criteria are: the recommendation case number, the locomotive road number (or a range of road numbers), and a recommendation date (or date range). Those recommendations that have been completed are marked for deletion and are not presented on the recommendation selection home page.

When a recommendation has been selected for transfer to a portable unit 14, the technician is prompted to identify herself, the recommendation will then be transferred, and the following information regarding the active recommendation is stored on the database 264 of the portable unit server 141 (see FIG. 11): the identity of the portable unit 14, the recommendation identity (i.e., the locomotive road number and the recommendation case number), the technician requesting the repair recommendation, the directory/file location where the recommendation directory is stored on the portable unit 14, the directory/file location where the repair feedback file will be stored on the portable unit 14, and the start time for the repair. This information is placed in the feedback queue 166 (see the step 274 of FIG. 11) so that it can be disseminated to all portable unit servers 141 and to the diagnosis and repair system 140.

Figure 13:
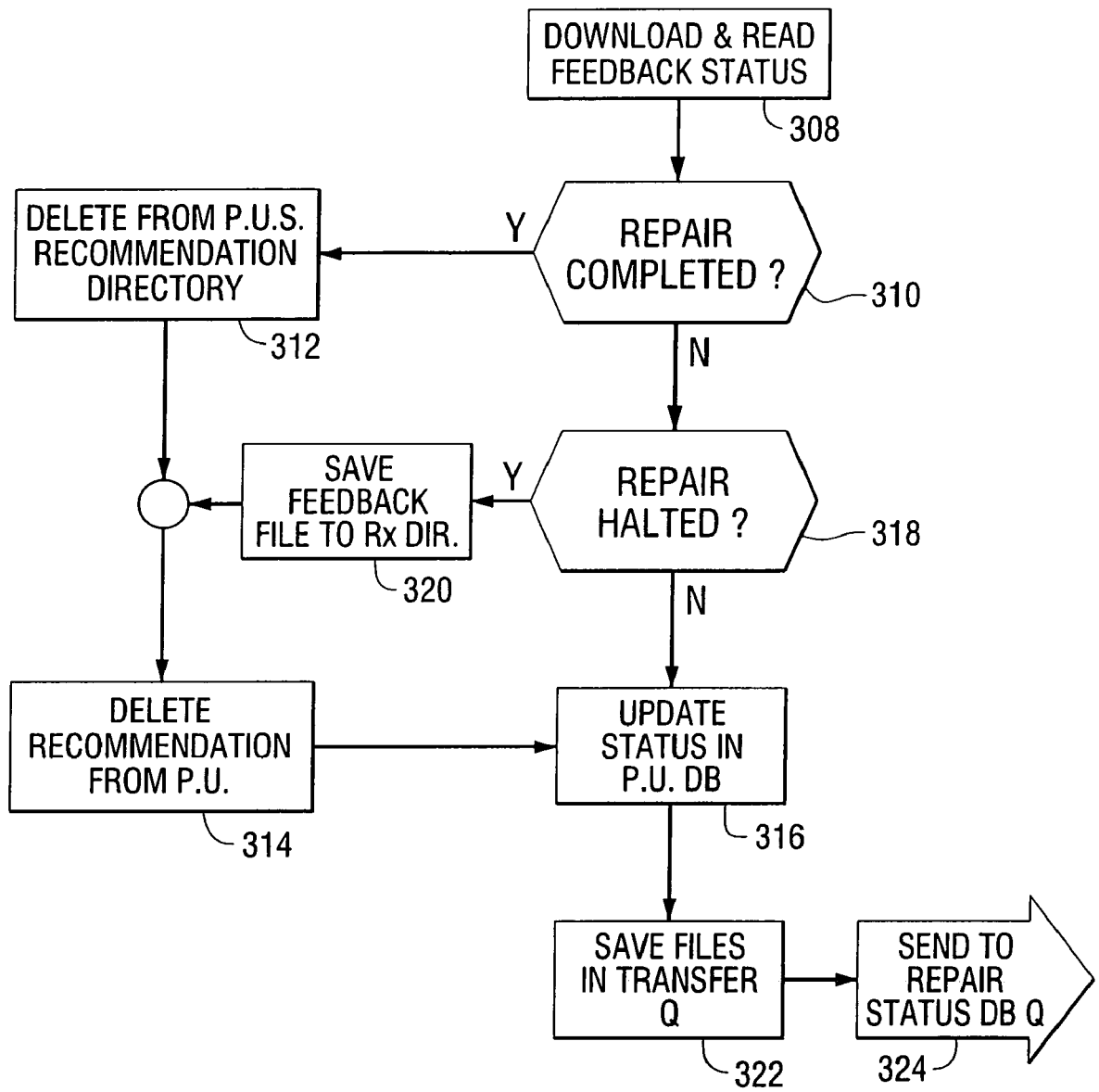

FIG. 13 is a flow chart depicting the feedback collection process (specifically the feedback information is provided by the data entry objects created as a part of the recommendation, as discussed above) of the present invention. As the technician completes certain repair steps, she is prompted to enter data about that repair step. For example, she may be asked to enter the part number of the replacement part. Later, the feedback information is relayed back to the portable unit server 141. In one embodiment, the portable unit 14 is a lap top computer with docking station features. In this embodiment, the portable unit server 141 detects when a portable unit 14 has been connected to a docking station. At that time, the portable unit server 141 automatically initiates transfer of the feedback file from the portable unit 14. It is recognized by those skilled in the art that the use of a docking station is not necessary for the operation of the present invention; other appropriate configurations are shown and discussed in conjunction with FIG. 3. The portable unit server 141 and the portable unit 14 can also be configured into a local area network (either wireless or wire based) to accommodate communication therebetween.

The process of downloading and reading the feedback file is illustrated in FIG. 13, beginning with a step 308. If the repair is completed, processing moves from a decision step 310 to a step 312 where the repair recommendation is deleted from the recommendation directory of the portable unit server 141. The repair recommendation is also deleted from the portable unit 14, as shown at a step 314. The status of the recommendation is then updated in the portable unit database at a step 316.

Returning to the decision step 310, if the repair has not been completed, the system inquires whether the repair has been halted, at a decision step 318. If the repair has been halted, the feedback file is saved to the recommendation directory residing on the portable unit server 141. This process is illustrated by a step 320. If the repair has not been halted, processing again moves to the step 316 where the repair status is updated. The information recorded in the portable unit status database, as indicated by the step 316, includes the current repair status and the time when the repair was completed or halted (the log out time). The repair status is also updated on the recommendation selection home page. At a step 322, the feedback files are saved and at a step 324, the feedback file is sent to the repair status database 184 (see FIG. 7). Providing this feedback data back to the diagnosis and repair system 140 is key to successfully validating the efficacy of the repair.

Figure 14:
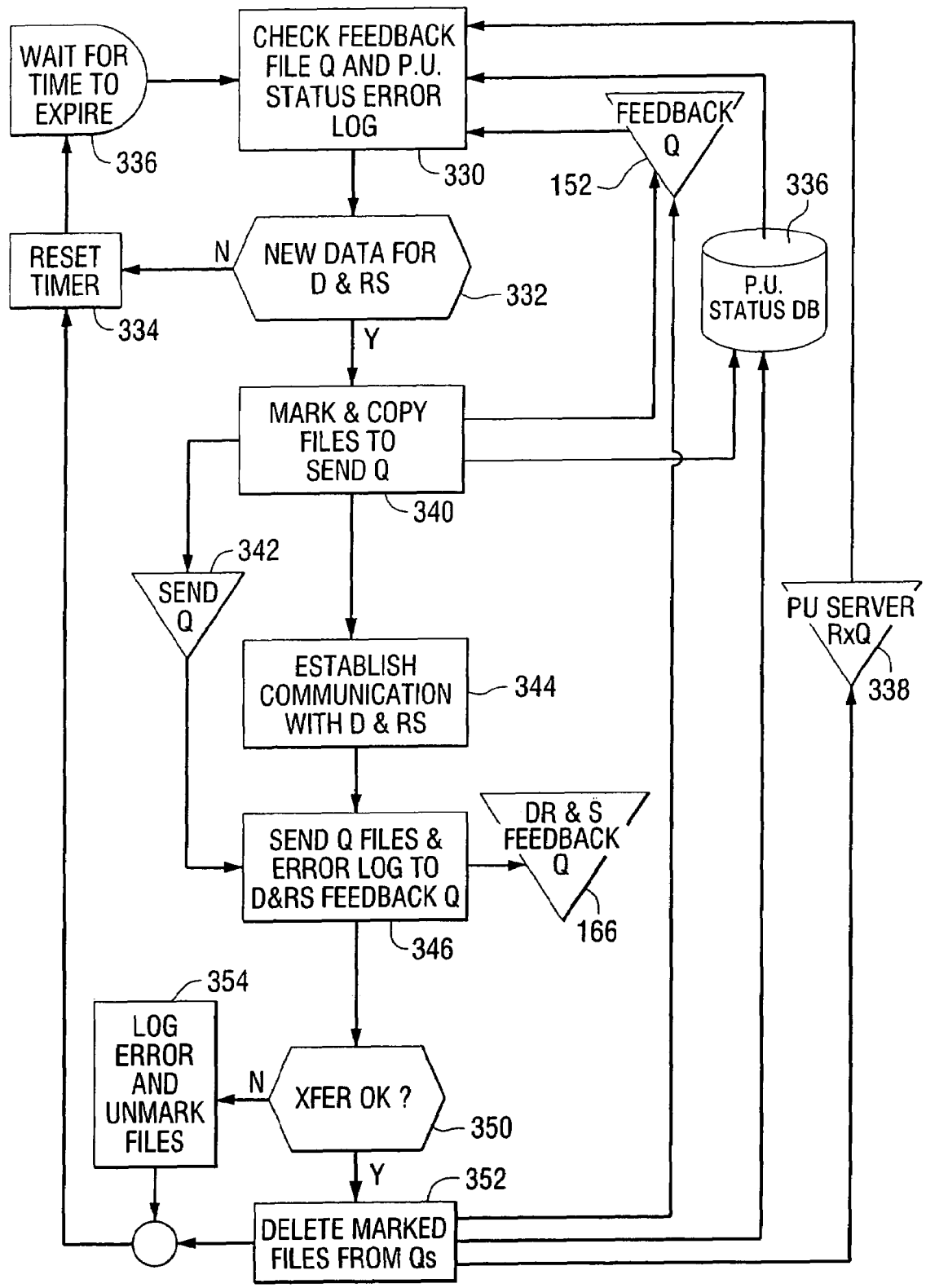

Once a feedback file is downloaded from the portable unit 14 to the portable unit server 141 (as discussed in conjunction with FIG. 13) the status of the repair is updated in the recommendation directory 150 (see FIG. 7) based on data in the status element of the feedback file. The feedback file is sent to the diagnosis and repair system 140 on a timer triggered basis, as illustrated in FIG. 14. The process of FIG. 14 involves moving the files to a temporary area, transferring the files, verifying that the transfer was successful, deleting the files from the temporary area, and resetting the transfer timer. When the timer expires, at a step 330, the feedback file queue 152 and the portable unit status error log are checked to determine whether there is any information to transfer to the diagnosis and repair system 140. If there is no new data to transfer, processing moves from the decision step 332 to a step 334 where the timer is reset. A step 336 simply indicates that the timer is running and upon its expiration, processing moves to the step 330. Note that signals are provided as an input to the step 330 from the feedback queue 152, the portable unit status database 336, and the portable unit server recommendation queue 338.

If there is data to be sent to the diagnosis and repair system 140, it is marked as transfer-in-progress data and copied to a queue file 342 for sending, as indicated at a step 340. At a step 344, the communication link is established with the diagnosis and repair system 140. Once the communication link is established, the portable unit server 141 sends a count of the number of files to be transferred, and at a step 346, the portable unit server 141 transfers the feedback and error log files to the diagnosis and repair system 140, specifically to the feedback queue thereof (represented by reference character step 166 and also illustrated in FIG. 7). In one embodiment, file transfer protocol (FTP) is the preferred means for sending these files. Upon receipt, the diagnosis and repair system 140 returns the number of files received. At a decision step 350, the number of files received is compared with the number of files transmitted and if these two values are the same, processing moves to a step 352. At this point, the transferred files are deleted from the feedback queue 152, the portable unit status database 336, and the portable unit server recommendation queue 338. If there was a problem with the transfer, processing moves to a step 354. Here, the transfer in progress markings are removed from the files and they are resent when the timer expires.

As has been discussed above, the portable unit server 141 interfaces bi-directionally with the portable unit 14. There are two initial inputs provided to the portable unit 14: the repair recommendation directory and clock time. When selected from the repair recommendation directory, an instantiated repair recommendation is transferred to the portable unit 14. The recommendation itself comprises a directory of web pages and supporting files for each step of the repair process. Also, when uploading a new instantiated recommendation from the portable unit server 141, the clock time on the portable unit 14 is synchronized with the clock time on the portable unit server 141.

Outputs received from the portable unit 14 by the portable unit server 141 include the portable unit identity and the repair feedback file. When a portable unit 14 is docked to the portable unit server 141 (or, in another embodiment, when a communication link is established between these devices), the portable unit 14 transmits its identification number for authorization and repair tracking. Also, when the two units are linked, the portable unit 14 is checked to determine whether there is any information in its repair feedback file 162. If information resides there, it is transferred to the portable unit server 141. Also, if the feedback file 162 indicates that the repair has been completed, the recommendation directory for the completed recommendation is deleted from the portable unit 14. The repair status is made available instantly on the particular portable unit server 141.

The portable unit server 141 also receives data from the recommendation authoring system 182 via the interface unit 40. See FIG. 8. When an instantiated recommendation is completed, it is transferred to the recommendation queue 146 within the diagnosis and repair system 140 (see FIG. 7). The recommendation queue 146 includes a subdirectory of all instantiated recommendations, which eventually will be copied to the portable unit server 141.

The portable unit server 141 also interfaces with the repair status subsystem 184. In one embodiment, once a day the portable unit server 141 transfers repair event data from its feedback file 165 to the repair status subsystem 184. This data is used to update the database of the repair status subsystem 184.

The repair status subsystem 184 (see FIG. 8) maintains and provides information on the status of each repair. Instantiating a repair recommendation triggers the creation of an entry in the locomotive history database 50 of the repair status subsystem 184. The locomotive history database 50 is updated with data values collected by the data entry objects during a repair operation. Each repair entry in the locomotive history database 50 supports the following data items: repair case number, railroad case number, locomotive road number, the date the recommendation was issued, the rail yard where the repair was performed, and a list of the rail yard personnel who worked on the recommendation. Each repair entry also includes the data values collected with each step, the date the repair step was performed (as derived from the data collection process), and the current repair status (e.g., none, active, halted, or complete).

A new repair status entry is created in the repair records database 50 of the repair status subsystem 184 as follows. When a new recommendation is instantiated in the recommendation authoring subsystem, a summary is passed to the repair status subsystem 184. This action triggers the creation of an entry in the repair records database 50 for the recommended repair. If a recommendation for a given case number is instantiated multiple times, the repair status subsystem 184 maintains the latest version of the recommendation. The repair status subsystem 184 maintains the most recent feedback irrespective of the version of the recommendation.

Figure 15:
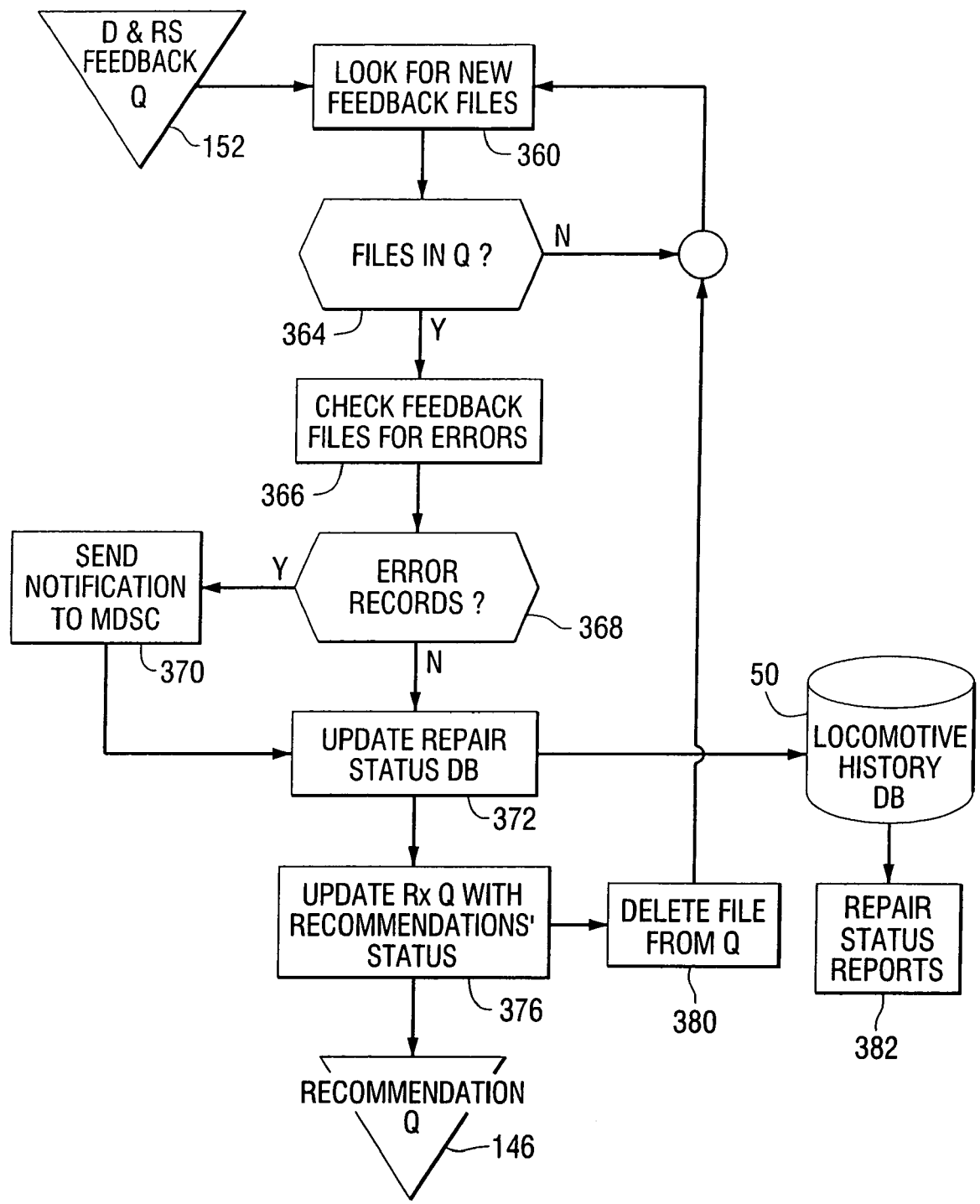

FIG. 15 is a flow chart depicting certain operational features of the repair status subsystem 184. As discussed above, periodically the portable unit server 141 transfers feedback records to the repair status subsystem 184, specifically to the locomotive history database 50 thereof. These feedback records (i.e., data entry objects) are created by the technician in the portable unit 14 after each repair step is performed. At a step 360, the feedback queue 152 is checked to see whether any new feedback files are located there awaiting downloading. If no feedback files are available, processing continues from a decision step 364 back to the step 360. If feedback files are awaiting downloading, processing continues from the decision step 364 to a step 366 where the feedback files are first processed in search of error messages. A version error from the portable unit server 141 is one type of error that might be encountered. This error message, which is generated at the step 272 in FIG. 11, indicates that an older version of a recommendation was already active when the newer version was transferred to the portable unit server 141. When such an error entry is found in the feedback file, the system notifies the repair expert at the monitoring and diagnostic service center 22. Another error message, a general version error, is triggered when the recommendation feedback is not based on the latest version of the recommendation. This error is basically the same as the previously discussed error, but may not be caught until feedback data is actually returned from the portable unit server 141 and analyzed. Again, when this error is discovered, notification is sent to the monitoring and diagnostic service center 22. Lastly, an incomplete error signifies that the repair data indicates completion of the repair, however, mandatory feedback data has not been provided. Again, an error message is sent to the monitoring and diagnostic service center 22. In other embodiments, other errors can be defined and detected dependent upon the needs of the repair experts at the monitoring and diagnostic service center. The identification of these errors is determined at a decision step 368. If errors are found, processing moves to a step 370 where the monitoring and diagnostic service center 22 is notified.

In addition to error messages, the feedback file from the portable unit server 141 (specifically from the feedback queue 152) contains several other message types. The "repair initiated" message indicates that a recommendation has been transferred to a portable unit 14 for beginning the repair process. A "data feedback" message indicates that repair data has been received from a portable unit 14. The repair initiated message and the data feedback message include the following data: the message type (e.g., repair initiated or data feedback), the repair case number, the railroad case number, the recommendation version number, the date the repair activity was begun, the rail yard where the repair was performed, the technicians who worked on the recommendation, and the feedback information collected during the repair. When a repair initiated message is received, the corresponding entry in the locomotive history database 50 is updated to reflect the party who initiated the repair, when it was initiated, and the specific portable unit 14 that received the recommendation. When a data feedback message is received, the locomotive history database 50 is updated with the appropriate data found within the message. The process of checking the messages and updating the locomotive history database 50 is depicted by a step 372 in FIG. 14. The locomotive history database 50 was previously discussed in conjunction with FIGS. 2 and 7.

The receipt of feedback data by the locomotive history database 50 indicates that a repair operation has begun, which requires updating the recommendation repair status in the recommendation queue 146 so that this information can be transferred to the portable unit server 141, which in turn causes this information to appear on the recommendation selection home page, that can be viewed at each portable unit 14. Each recommendation has one of the following statuses: waiting to be worked on, transferred to a portable unit 14 (which implies that someone intends to work on the repair), in progress (indicating that some feedback data has been received, but the repair is not completed nor halted). The process of updating the recommendation queue 146 with the status information is illustrated at a step 376. After a feedback file has been successfully processed (indicating that the repair is complete), the feedback file is deleted from the recommendation queue 146, as illustrated at a step 380.

A processing step 382 indicates the preparation of repair status reports based on information in the locomotive history database 50. Various types of reports are available as follows: a report summarizing the status of all non-closed repair recommendations (and if the recommendation has been transferred to a portable unit 14, the identification of the unit to which it has been transferred and the transfer time), a detailed report showing all of the available data that has been collected for a specific recommendation, a "newly-closed" recommendation report, an error report summarizing all repair cases that have been closed or halted without collecting all of the specified repair feedback data, an error report indicating if someone is entering data from an outdated version of a repair recommendation, and an error report indicating that more than one repair technician has downloaded the same repair case number. The first mentioned summary report can be used to highlight the age of each active recommendation. The older reports serve as a trigger to notify personnel at the monitoring and diagnostic service center 22 to contact the railroad to discern the status of the repair effort. The detailed report of all available data can be used by personnel to determine whether a repair must be investigated. The newly closed report can serve as a vehicle to evaluate the completeness of a repair event. In general, the error reports are used to trigger further communications between the appropriate railroad or MDSC personnel. Further, the repair status report can be displayed, on a monitor board at the service shop 16, for example, so that railroad personnel can check the status of the repairs.

The repair recommendation authoring system 182 provides the portable unit server 141 with a list of the recommendations (case and version number and destination) that have been transferred to portable units 14. Each time a recommendation is transferred to a portable unit 14, a record of the case number, version number, and destination is sent to the locomotive history database 50.

The repair status subsystem 184 also interfaces bi-directionally with the recommendation authoring system 182. In particular, when a recommendation is instantiated, a summary is passed to the repair status subsystem 184 so that an entry can be created in the locomotive history database 50 for the recommended repair. When a repair status is updated, the repair status subsystem 184 passes the status update to the recommendation authoring subsystem 182 so that the recommendation queue can be updated. This process is illustrated at the step 376 of FIG. 15.

The portable unit 14 displays the repair instructions to the technician and collects the feedback of the repair event. Included among the functions of the portable unit 14 are: providing a log in and log out interface with the portable unit server 141, displaying repair instructions and supporting information, updating the repair feedback file when a repair action is completed and erasing all repair specific directory files when a repair is halted or completed (on command from the portable unit server 141). The portable unit 14 includes a browser software application such as Internet Explorer or Netscape, to navigate through the repair directories when they are presented in a web page format.

The two data concepts incorporated into the portable unit 14 are the portable unit identity and repair feedback files. The portable unit identity is a uniquely assigned number (e.g., an internet address) that identifies the portable unit 14 and the rail yard where it is located. The identification number is also linked to the application software and hardware version numbers to track the configuration of the portable unit 14.

The repair feedback file is created on the portable unit 14 to capture data during the repair process. The feedback file consists of a status element and several feedback elements. The status element includes the recommendation case number or identity and the repair status. If the repair was halted, the step number at which that occurred is included in the status element. If the repair was completed, then the completion time is included in the status element. Each element of the repair feedback file is written to the file when the repair is finished. The file contains: the repair technician identity, the shop location, the repair recommendation identification number, the repair code, the repair action initiation time and date, the feedback data collected for the repair action, and the time and date the repair action was completed.

Figure 16:
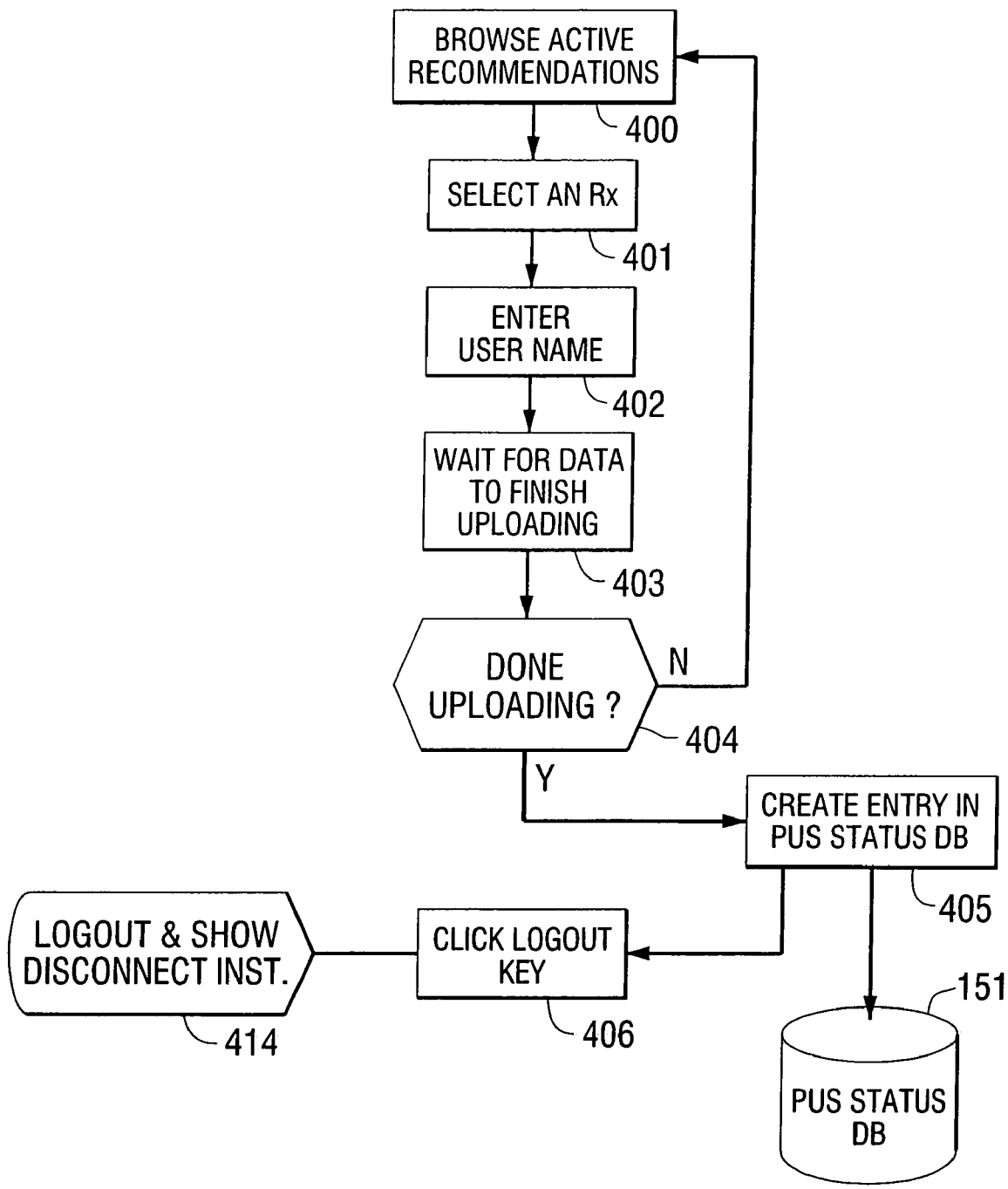

The functionality of the portable unit 14 is illustrated by the flow chart of FIG. 16. With the portable unit 14, the technician can browse the recommendation selection home page, as depicted by a step 400. At a step 401, the technician selects a recommendation and at a step 402 the technician is queried to enter his user name. Upon verification that the technician is a legitimate user, the files associated with the selected recommendation are uploaded to the portable unit 14, as depicted at a step 403. Processing then moves to a decision step 404. If the technician has not completed uploading all the needed recommendations, processing returns to the step 400. If the technician has all the information he needs, then processing moves from the decision step 404 to a step 405 where the status of the recommendation on the portable unit server 141 is updated (specifically the portable unit status database 151) to indicate that the recommendation files have been transferred to a portable unit 14. This information is eventually passed back to the diagnosis and repair system 140. Processing next moves to a log out step 406 where the portable unit 14 logs off of the portable unit server 141, having collected all the needed repair information.

At this point, instructions will be displayed showing the technician how to "un-dock" the portable unit 14 from the docking station. In other embodiments where docking stations are not utilized, this instruction is unnecessary. Display of these instructions is depicted by reference character 414. Returning to the decision step 404, if downloading has not been completed, processing returns to the browsing operation depicted by the step 400.

After the specific recommendation directory and related file have been placed in memory, the portable unit 14 launches a web browser application. The browser application follows the page hierarchy defined in the recommendation. In particular, there will always be a "home" button to support the three modes of operation. If there are multiple recommendations on the portable unit 14, but none are active, then the home button produces a repair selection page similar to the portable unit server recommendation home page. If there is only a single recommendation on the portable unit 14, then the home button returns processing to the first page of this recommendation. Finally, if there are many recommendations on the portable unit 14 but only one is marked as active, the home button returns to the first page of the active recommendation. Note that the browser application will not have access to information other than files included in the instantiated recommendation stored in the portable unit 14 and a few help files also located there.

Figure 17:
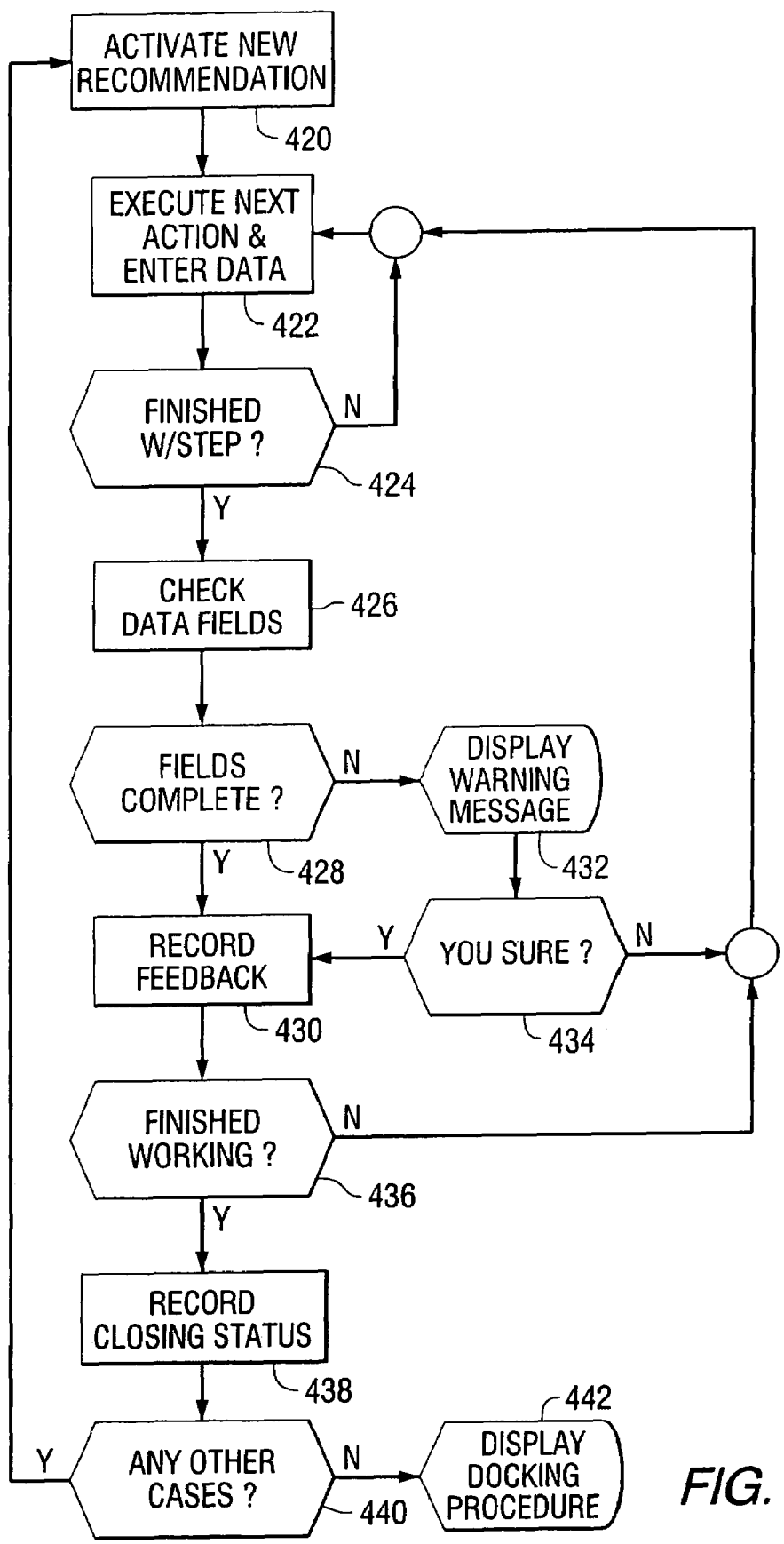

Processing of the web pages by the browser application is depicted in FIG. 17. At a step 420, a new recommendation is activated by opening the repair instructions web page for that recommendation. This process automatically captures the date and time the instructions were opened and prompts for the identification of the technician. If the repair had previously been opened, it will have been tagged as either halted or completed on the portable unit 14. Thus, reopening the repair causes the halted or completed tag to be deleted. The top level web page includes a summary of the next step in the repair process. At this point, the repair technician turns to the first repair process step, as indicated at a step 422. This page contains links to detailed technical documentation for this step and also provides data entry mechanisms (i.e., feedback) for the service technician to record the data that is to be collected for that repair step. At a decision step 424, an inquiry is made as to whether the repair technician has completed that step and entered the feedback information. A negative answer returns processing to the step 422. An affirmative answer moves processing to a step 426 where some rudimentary checking and editing is performed on the fields of the feedback data. If the fields are complete, processing moves from a decision step 428 to a step 430 where the feedback data is written to a local file on the portable unit 14. In another embodiment, the feedback data can be transferred back to the MDSC 20 in real time. If the fields are not complete, processing moves from the decision step 428 to a step 432 where a warning message is displayed. The warning message is generated when any of the values entered in an individual step are invalid, as detected at the step 426. The browser application prompts the technician to re-enter the data, but he can override the error message, as depicted by the decision step 434. An override returns processing to the step 430 where the feedback data is written to the local file. If the technician is unsure of the recorded feedback data, processing moves from the decision step 434 back to the step 422 for re-execution of the current repair step and feedback collection.

When processing reaches the decision step 436, a determination is made whether the entire repair process has been completed. If it has not, processing returns to the step 422 for viewing the next repair step. When the repair is completed, processing moves from the decision step 436 to a step 438 where the technician closes the recommendation. This can be accomplished by a recommendation close button on the web page, closing the browser window, or moving to another web page that is not part of the present recommendation. The system queries the technician as to other repair cases at a decision step 440. If the technician wishes to work on other repairs, the system returns to the step 420 where the recommendation selection home page is displayed. At this point, the technician can select another repair from that home page. If there are no additional repairs to be performed, after the decision step 440, the docking instruction is displayed as depicted at a step 442. In lieu of the docking instructions, in other embodiments the process for reconnecting to the portable unit server 141 is displayed.

As discussed above, there is a considerable amount of technical documentation available to the technician using the portable unit 14. The technician can navigate or search through the technical documentation by using wizard applications or visual drill downs. Additionally, the technical documentation includes on-line tutors that can be used to enhance the technician's understanding of the structure and function of the locomotive. The tutors are available in various levels of difficulty.

The portable unit 14 interfaces bi-directionally with the portable unit server 141. When the portable unit 14 is connected to the portable unit server 141, the latter asks for the identity of the portable unit 14 for authorization and repair tracking purposes. Also, the portable unit is checked for the existence of a repair feedback file by the portable unit server 141. If any such files exist, they are transferred to the portable unit server 141 and are stored in the portable unit server database 151 in the directory for that recommendation.

Information transferred from the portable unit server 141 to the portable unit 14 includes the repair recommendation directory home page and the clock time. When selected from the home page, the instantiated recommendation is transferred to the portable unit 14 in the form of a directory of web pages and supporting data files. Whenever the portable unit 14 uploads a new instantiated recommendation, the clock time on the portable unit is synchronized with the clock time on the portable unit server 141.

Figure 18:
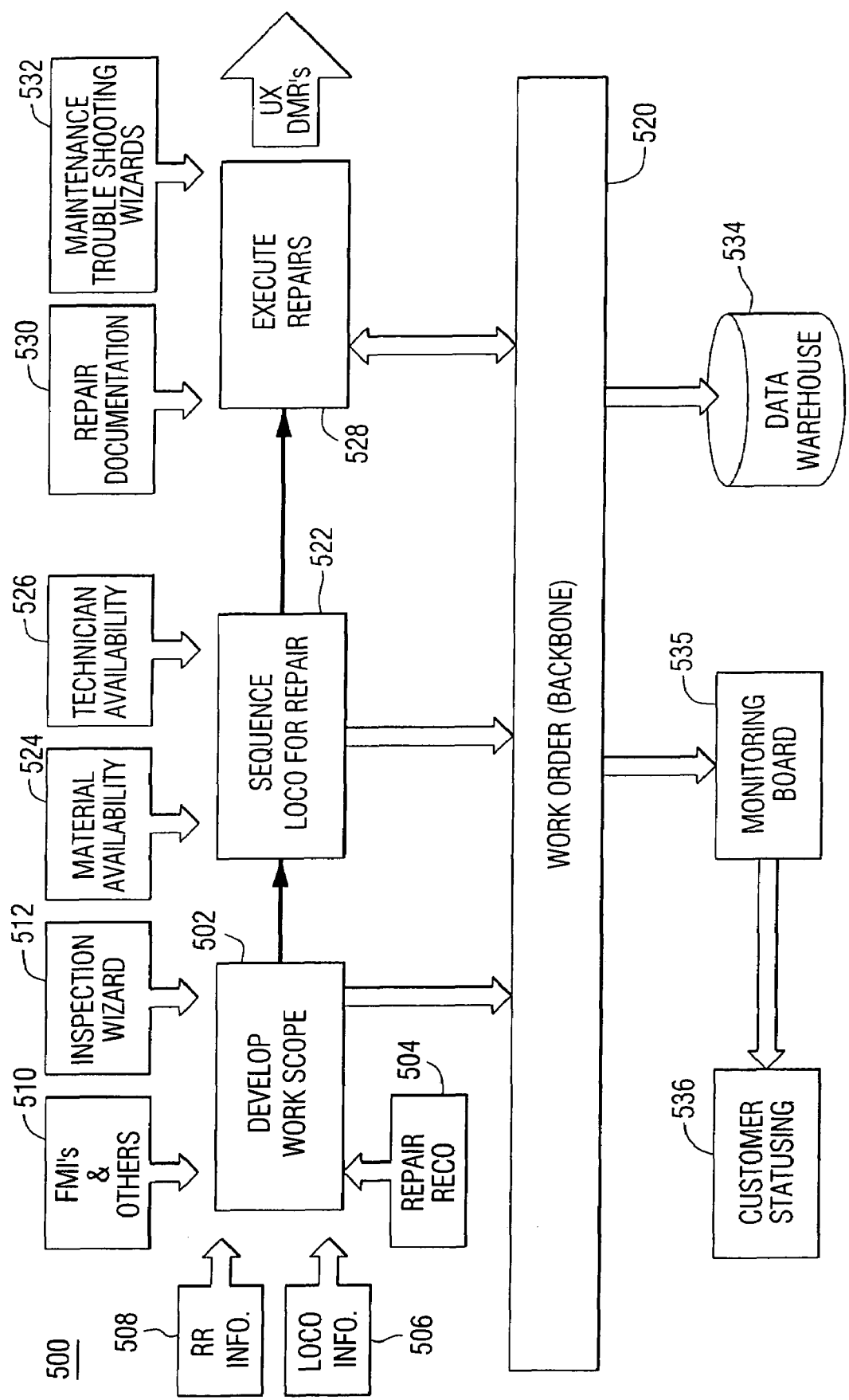

FIG. 18 illustrates a work-flow module 500 embodying the teachings of the present invention to control the various processes associated with implementing a repair or service recommendation. The first step of the work order module 500 is the development of a work scope at a step 502. The development of the work scope is influenced by certain tasks and processes input to a work order. For example, a repair recommendation 504, locomotive specific information 506, railroad specific information 508, field modification instructions and other recommendations requiring implementation 510 and an inspection wizard 512, the use of which may identify and add additional items to the work scope 502. The work scope information is input to a work order backbone 520 for creating a work order to implement the various tasks associated with the work scope 502. In preparing the work order, the cycle time associated with each task must be considered. Additionally, consideration must be given to sequencing available locomotives for repair. This information is also input to the work order backbone 520 from a step 522. Factors that influence the repair schedule include material availability as indicated by a step 524 and the availability of other required resources, such as the availability of technicians to implement the repairs as indicated by the reference character 526.

Following the sequencing step 522, the work order is activated and execution of the repair initiated as indicated by a step 528. The technician is directed during the execution of the repair through the portable unit 14 as discussed above. The information displayed on the portable unit 14 directs the step-by-step activities of the technician through the repair process including providing documentation and information from the various databases and modules discussed in conjunction with FIG. 2. With regard to FIG. 8, this information is indicated by a reference character 530. The technician also utilizes maintenance troubleshooting wizards, identified by a reference character 532 during the repair process. Also as discussed above, data entry objects (feedback) are provided by the technician as the repair progresses. This information is shown as symbolically supplied to the work order backbone 520 and from there stored in a data warehouse 534. Real time repair status information is provided from the work order backbone 520 to a monitoring board 535, which may be located in the service shop 16 or at the service yard 13 for providing information on the status of the various in-process repairs. Further, information as to the repair processes can be supplied directly to a customer either in written form or transmitted electronically for display at a customer site, as shown by a reference character 536. Additionally, the status information generated by the work order backbone 520 can be reviewed and used to improve the reliability of the various locomotive subsystems and further used to improve repair processes across all the service shops and service yards operated by the railroad. Communication of this status information across the railroad network can be efficiently accomplished via satellite communications, a land-based system or through a cellular telephone network.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A method for implementing a service recommendation for a locomotive, the method comprising:
   collecting operating information from the locomotive;
   communicating the operating information to a remote diagnostic center;
   analyzing the operating information at the diagnostic center;
   generating a service recommendation in response to the step of analyzing;
   posting the service recommendation to an Internet site;
   providing an address of the Internet site to a computing device operated by a technician at a site of the locomotive;
   using the address, accessing the Internet site from the computing device; and
   downloading the service recommendation from the Internet site to the computing device for implementing the service recommendation on the locomotive.

2. The method of claim 1 further comprising downloading multimedia information associated with the service recommendation from the Internet site to the computing device and displaying the multimedia information on a display of the computing device.

3. The method of claim 2 wherein the multimedia information comprises one or more of pictures, photographs, text, pre-recorded audio, real-time audio, pre-recorded video and real-time video.

4. The method of claim 1 wherein the service recommendation comprises instructions for conducting repairs or performing maintenance operations on the locomotive, and wherein the repairs or maintenance operations are responsive to an anomalous operating condition of the locomotive as determined from the operating information.

5. The method of claim 1 wherein the diagnostic center is located to service a plurality of geographically distributed locomotives, and wherein a site of the locomotive is a remotely-located service facility.

6. The method of claim 1 further comprising returning information to the diagnostic center from the site of the locomotive via the wireless communications link during implementation of the service recommendation.

7. The method of claim 6 wherein the step of returning information further comprises returning video images of components of the locomotive.

8. The method of claim 6 wherein the step of returning information further comprises returning an audio message.

9. The method of claim 1 further comprising at a location of the locomotive, ordering repair parts from a parts inventory store.

10. The method of claim 1 wherein the service recommendation includes information regarding the structure and operation of locomotive components as related to the service recommendation.

11. The method of claim 1 further comprising requesting and receiving from the remote diagnostic center technical information relevant to the service recommendation.

12. The method of claim 1 further comprising bidirectionally communicating information between the computing device and the remote diagnostic center during execution of the service recommendation.

13. The method of claim 1 wherein each locomotive is assigned a unique designator, the method further comprising providing the unique designator to the remote diagnostic center via the wireless communications link, and wherein each service recommendation is associated with a specific locomotive based on the locomotive designator.

14. The method of claim 1 further comprising transmitting queries from the remote diagnostic center to the computing device, wherein the queries request locomotive operational information.

15. The method of claim 1 further comprising requesting configuration information for one or more locomotive components from die remote diagnostic center over the wireless communications link.

16. The method of claim 1 further comprising:
   passing a bar code reader proximate a bar code disposed on a component of the locomotive; and
   providing the information derived from the bar code to the remote diagnostic center.

17. The method of claim 1 further comprising:
   taking a video image of a component of the locomotive; and
   providing the video image to the remote diagnostic center.

18. The method of claim 1 further comprising creating a record when a service recommendation is provided to the computing device.

19. The method of claim 1 wherein the service recommendation further comprises technical information in the form of one or more of schematic diagrams, photographs, textual technical descriptions, block diagrams, and parts list relevant to the service recommendation.

20. A system for implementing a service recommendation for a locomotive, wherein the service recommendation is created remote from the locomotive, the system comprising:
   a data collecting component on the locomotive for collecting locomotive operating information;
   a first communicating component responsive to the data collecting component for sending the operating information from the locomotive to a remote site for creating the service recommendation;
   at the remote site, a second communicating component for posting the service recommendation to an Internet site having an address; and
   a computing component at a location of the locomotive for downloading the service recommendation from the Internet site by accessing the address, the computing component for use by a technician in implementing the service recommendation on the locomotive.

21. The system of claim 20 wherein the second communicating component provides an address of the Internet site to the computing component.

22. The system of claim 20 wherein the second computing component comprises an input/output device further comprising a display for displaying multimedia information associated with the service recommendation.

23. The system of claim 20 wherein the service recommendation includes instructions for making one or more repairs to or performing maintenance on the locomotive and technical documentation related to the structure and function of locomotive components.

24. The system of claim 20 wherein the second computing component downloads the service recommendation from the Internet site over a wireless communications link.

25. The system of claim 20 wherein the service recommendation comprises multimedia information further comprising one or more of pictures, photographs, text, pre-recorded audio, real-time audio, pre-recorded video and real-time video.

26. The system of claim 20 wherein the service recommendation comprises instructions for conducting repairs or performing maintenance operations on the locomotive.

27. The system of claim 20 wherein the remote site comprises a diagnostic center for creating servicing recommendations for a plurality of geographically distributed locomotives.

28. The system of claim 20 wherein the second computing component returns information to the remote site by posting the information to the Internet site.

29. The system of claim 20 wherein the second computing component returns information to the remote site over a wireless communications link.

30. The system of claim 29 wherein the information returned to the remote site comprises video images of locomotive components or audio information.

31. The system of claim 20 wherein the second computing component orders repair parts.

32. The system of claim 20 wherein the service recommendation includes technical information related to the structure and operation of locomotive components related to the service recommendation.

33. The system of claim 20 wherein the second computing component requests and receives from the remote site technical information relevant to the service recommendation.

34. The system of claim 20 wherein the second computing component and the remote site communicate bidirectionally during implementation of the service recommendation.

35. The system of claim 20 wherein each locomotive is assigned a unique designator, and wherein each service recommendation is associated with a specific locomotive based on the locomotive designator.

36. The system of claim 20 wherein the remote site queries the second computing component for locomotive operational information.

37. The system of claim 20 wherein the second computing component requests configuration information for a locomotive component from the remote site.

38. The system of claim 20 further comprising a bar code reader for determining information relative to a locomotive component and providing the information to the second computing component.

39. The system of claim 20 wherein the service recommendation further comprises technical information in the form of one or more of schematic diagrams, photographs, textual technical descriptions, block diagrams, and parts list relevant to the service recommendation.

40. The system of claim 20 wherein the first and the second communications components exchange information via an instant messaging link.

41. The system of claim 20 wherein the computing component downloads historical repair information for the locomotive.

42. The system of claim 20 wherein the computing component downloads software and hardware configuration information for the locomotive.

43. The system of claim 20 wherein the computing component provides feedback information to the remote diagnostic center regarding a status of the implementation of the service recommendation.

44. A method for creating a service recommendation for a locomotive, the method comprising:
    identifying the locomotive to which the service recommendation applies;
    analyzing operating information provided from the locomotive;
    identifying service actions to be executed during the service recommendation;
    selecting service steps in response to the service actions,
    selecting technical documentation pertinent to the service recommendation from a technical documentation repository;
    identifying data to be collected during implementation of the service recommendation;
    bundling the service actions, service steps, technical documentation and data to be collected to create a service recommendation; and
    providing the service recommendation to a portable unit at the site of the locomotive where the service recommendation is to be implemented, the portable unit providing return information related to implementation of the service recommendation during or after implementation.

45. The method of claim 44 wherein the service steps comprise coded service steps and free-text service steps.

46. A computer program product related to a service recommendation for a locomotive, the computer program product comprising:
    a computer usable medium having computer readable program code modules embodied in the medium for implementing the service recommendation;
    a computer readable first program code module for collecting operating information from the locomotive;
    a computer readable second program code module for communicating the operating information to a remote diagnostic center;
    a computer readable third program code module for analyzing the operating information at the diagnostic center;
    a computer readable fourth program code module for generating a service recommendation in response to the step of analyzing;
    a computer readable fifth program code module for posting the service recommendation to an Internet site;
    a computer readable sixth program code module for providing an address of the Internet site to a computing device operated by a technician at a site of the locomotive;
    a computer readable seventh program code module using the address for accessing the Internet site from the computing device; and
    a computer readable eighth program code module for downloading the service recommendation from the Internet site to the computing device for implementing the service recommendation on the locomotive.

47. A computer program product for implementing a service recommendation for a locomotive, wherein the computer program product controls a portable computing device having a display, the computer program product comprising:
- a computer usable medium having computer readable program code modules embodied in the medium for implementing the service recommendation;
  - a computer readable first program code module for collecting information from the locomotive;
  - a computer readable second program code module for downloading the service recommendation from an Internet site;
  - a computer readable third program code module controllable by a technician implementing the service recommendation for displaying elements of the service recommendation on the display; and
  - a computer readable fourth program code module for providing data to a remote diagnostic center related to implementation of the service recommendation.

48. A computer program product for creating a service recommendation for a locomotive, comprising:
- a computer usable medium having computer readable program code modules embodied in the medium for creating the service recommendation;
  - a computer readable first program code module for identifying the locomotive to which the service recommendation applies;
  - a computer readable second program code module for analyzing operating information provided from the locomotive;
  - a computer readable third program code module for identifying service actions to be performed during the execution of the service recommendation;
  - a computer readable fourth program code module for selecting service steps in response to the service actions,
  - a computer readable fifth program code module for selecting technical documentation pertinent to the service recommendation from a technical documentation repository;
  - a computer readable sixth program code module for identifying data to be collected during implementation of the service recommendation;
  - a computer readable seventh program code module for bundling the service actions, service steps, technical documentation and data to be collected to create a service recommendation; and
  - a computer readable eighth program code module for providing the service recommendation to a portable unit where the service recommendation is to be implemented, the portable unit providing return information related to implementation of the service recommendation during or after implementation.

* * * * *